(12) United States Patent
Hasegawa et al.

(10) Patent No.: US 8,843,542 B2
(45) Date of Patent: Sep. 23, 2014

(54) INFORMATION PROCESSING DEVICE, ARITHMETIC PROCESSING METHOD, AND ELECTRONIC APPARATUS

(75) Inventors: Hiroshi Hasegawa, Chino (JP); Fumio Koyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1217 days.

(21) Appl. No.: 12/731,553

(22) Filed: Mar. 25, 2010

(65) Prior Publication Data

US 2010/0250641 A1    Sep. 30, 2010

(30) Foreign Application Priority Data

Mar. 26, 2009 (JP) ................. 2009-075903

(51) Int. Cl.
| | |
|---|---|
| *G06F 7/50* | (2006.01) |
| *G06F 9/34* | (2006.01) |
| *G06F 9/30* | (2006.01) |
| *G06F 9/38* | (2006.01) |

(52) U.S. Cl.
CPC ............. *G06F 9/30145* (2013.01); *G06F 9/34* (2013.01); *G06F 9/30105* (2013.01); *G06F 9/30029* (2013.01); *G06F 9/3885* (2013.01); *G06F 9/30032* (2013.01); *G06F 9/30167* (2013.01); *G06F 9/30043* (2013.01); *G06F 9/3001* (2013.01)
USPC ............................ 708/670; 708/200; 708/490

(58) Field of Classification Search
None
See application file for complete search history.

(56) References Cited

U.S. PATENT DOCUMENTS

| | | | |
|---|---|---|---|
| 6,026,486 A | 2/2000 | Kodama et al. | |
| 6,421,696 B1* | 7/2002 | Horton | 708/404 |
| 6,550,000 B1 | 4/2003 | Minematsu et al. | |
| 7,185,176 B2 | 2/2007 | Tanaka et al. | |
| 2006/0047736 A1* | 3/2006 | Glasner et al. | 708/445 |

FOREIGN PATENT DOCUMENTS

| | | |
|---|---|---|
| JP | A-8-292876 | 11/1996 |
| JP | A-10-91439 | 4/1998 |
| JP | A-2000-222208 | 8/2000 |
| JP | A-2001-13185 | 1/2001 |

* cited by examiner

*Primary Examiner* — Michael D Yaary
(74) *Attorney, Agent, or Firm* — Oliff PLC

(57) ABSTRACT

An information processing device includes: plural input registers including a first input register and a second input register; an added value register; a first adding unit that performs addition processing for stored data of the first input register and stored data of the second input register; a second adding unit that performs addition processing for connected data, which is obtained by connecting the stored data of the first input register and the stored data of the second input register, and stored data of the added value register; and plural output registers in which a processing result of the first adding unit or the second adding unit is stored, wherein in each of given execution cycles, the first adding unit stores a processing result of the first adding unit in any one of the plural output registers and the second adding unit stores a processing result of the second adding unit in any one of the plural output registers.

8 Claims, 19 Drawing Sheets

| ARITHMETIC PROCESSING | GENERAL-PURPOSE REGISTER | PROCESSING CONTENT |
|---|---|---|
| add | RG0 | RG0+RG1 → {RG20,RG10} |
| | RG1 | {RG1,RG0}+{RG3,RG2}<br>→ {RG50,RG40,RG30} |
| | RG2 | RG2+RG3 → {RG22,RG12} |
| | RG3 | |
| mlt | RG4 | RG4×RG5 → {RG14,RG24} |
| | RG5 | |
| | RG6 | RG6×RG7 → {RG16,RG26} |
| | RG7 | |
| sub | RG8 | RG9-RG8 → RG18 |
| | RG9 | |
| dec | RGa | RGa-1 → RG1a |
| inc | RGb | RGb+1 → RG1b |
| and (sftl) | RGc | RGc and RGd → RG1c<br>RGc<<1 → RG2c |
| | RGd | |
| or (sftr) | RGe | RGe and RGf → RG1e<br>RGe>>1 → RG2e |
| | RGf | |

FIG. 8

| | b15 | b14 | b13 | b12 | b11 | b10 | b9 | b8 | b7 | b6 | b5 | b4 | b3 | b2 | b1 | b0 | EXPLANATION |
|---|---|---|---|---|---|---|---|---|---|---|---|---|---|---|---|---|---|
| LDR | 0 | 0 | 0 | TRANSFER DESTINATION REGISTER | | | | | | | | | TRANSFER SOURCE REGISTER | | | | load register |
| LDI | 0 | 0 | 1 | TRANSFER DESTINATION REGISTER | | | | | | | | | IMMEDIATE VALUE | | | | load immediate |
| LDM | 0 | 1 | 0 | TRANSFER DESTINATION REGISTER | | | | | | | | | MEMORY ADDRESS | | | | load memory |
| STM | 0 | 1 | 1 | TRANSFER DESTINATION REGISTER | | | | | | | | | MEMORY ADDRESS | | | | store memory |
| LDU | 1 | 0 | 0 | TRANSFER DESTINATION REGISTER | | | | | | | | | TRANSFER SOURCE REGISTER | | | | |
| STU | 1 | 0 | 1 | TRANSFER DESTINATION REGISTER | | | | | | | | | TRANSFER SOURCE REGISTER | | | | |
| JP | 1 | 1 | 0 | 0 | 0 | 0 | BRANCH DESTINATION ABSOLUTE ADDRESS | | | | | | | | | | jump |
| JS | 1 | 1 | 0 | 0 | 0 | 1 | SUBROUTINE BRANCH DESTINATION ABSOLUTE ADDRESS | | | | | | | | | | jump subroutine |
| JP0 | 1 | 1 | 0 | 0 | 1 | 0 | RELATIVE JUMP DESTINATION ADDRESS | | | | | | | | | | jump offset |
| JS0 | 1 | 1 | 0 | 0 | 1 | 1 | SUBROUTINE BRANCH RELATIVE ADDRESS | | | | | | | | | | jump subroutine offset |
| JPR | 1 | 1 | 0 | 1 | 0 | 0 | | | | | | REGISTER ABSOLUTE BRANCH | | | | | jump register |
| JSR | 1 | 1 | 0 | 1 | 0 | 1 | | | | | | REGISTER RELATIVE BRANCH | | | | | jump subroutine register |
| RTS | 1 | 1 | 0 | 1 | 1 | 0 | | | | | | | | | | | return subroutine |
| NOP | 1 | 1 | 0 | 1 | 1 | 1 | | | | | | | | | | | |
| EQR | 1 | 1 | 1 | 0 | 0 | 0 | REFERENCE REGISTER | | | | | COMPARATIVE REGISTER | | | | | equal register |
| EQI | 1 | 1 | 1 | 0 | 0 | 1 | REFERENCE REGISTER | | | | | IMMEDIATE VALUE | | | | | equal immediate |
| NER | 1 | 1 | 1 | 0 | 1 | 0 | REFERENCE REGISTER | | | | | COMPARATIVE REGISTER | | | | | not equal register |
| NEI | 1 | 1 | 1 | 0 | 1 | 1 | REFERENCE REGISTER | | | | | IMMEDIATE VALUE | | | | | not equal immediate |
| GTR | 1 | 1 | 1 | 1 | 0 | 0 | REFERENCE REGISTER | | | | | COMPARATIVE REGISTER | | | | | greater than |
| GTI | 1 | 1 | 1 | 1 | 0 | 1 | REFERENCE REGISTER | | | | | IMMEDIATE VALUE | | | | | |
| LTR | 1 | 1 | 1 | 1 | 1 | 0 | REFERENCE REGISTER | | | | | COMPARATIVE REGISTER | | | | | less than |
| LTI | 1 | 1 | 1 | 1 | 1 | 1 | REFERENCE REGISTER | | | | | IMMEDIATE VALUE | | | | | |

FIG. 10

```
LDR   RG1,RGd      // HIGH-ORDER BITS OF FIRST ARGUMENT
LDR   RG3,RGf      // HIGH-ORDER BITS OF SECOND ARGUMENT

LDR   RG0,RGc      // LOW-ORDER BITS OF FIRST ARGUMENT
LDR   RG2,RGe      // LOW-ORDER BITS OF SECOND ARGUMENT

LDR   RG8,RG30     // SAVE 32-bit ADDITION PROCESSING RESULT
LDR   RG9,RG40     // SAVE 32-bit ADDITION PROCESSING RESULT
LDR   RGa,RG50     // SAVE 32-bit ADDITION PROCESSING RESULT LDR   RG1,RG12     // MOVE SUM OF HIGH-ORDER BITS TO RG1
LDI   RG3,1000h    // SET OFFSET OF TABLE A IN RG3

LDU   RG4,RG12     // READ DATA IN RG4 FROM ADDRESS OF RG12

LDI   RG3,2000h    // SET OFFSET OF TABLE B IN RG3

LDU   RG6,RG12     // READ DATA IN RG6 FROM ADDRESS OF BR+RG12

LDR   RG7,RG10     // COPY RG10 TO RG7 (EXECUTE MULTIPLICATION)

LDR   RG0,RG26     // WRITE LOW-ORDER BITS OF MULTIPLICATION RESULT IN RG0
LDR   RG2,RG4      // WRITE VALUE READ OUT FROM TABLE IN RG2

LDR   RG0,RG10     // WRITE RESULT
LDR   RG1,RG20     // WRITE RESULT
```

FIG. 14

```
LDR   RG1,RGd             // READ HIGH-ORDER BITS
LDR   RG2,RGf

ADD   RG4,RG1,RG2         // RG1+RG2=RG4
ADD   RG4,1000h           // RG4=RG4+1000h
LDU   RG5,RG4             // READ DATA IN RG5 FROM ADDRESS OF RG4

LDR   RG1,RGc             // READ LOW-ORDER BITS
LDR   RG2,RGe

ADD   RG6,RG1,RG2         // RG1+RG2=RG6
ADD   RG4,1000h           // RG4=RG4+1000h
LDU   RG8,RG7             // READ DATA IN RG8 FROM ADDRESS OF RG7

MUL   RG9,RG8,RG6         // RG8*RG6=RG9
ADD   RG0,RG9,RG5         // RG9+RG5=RG0
```

INFORMATION PROCESSING DEVICE, ARITHMETIC PROCESSING METHOD, AND ELECTRONIC APPARATUS

CROSS-REFERENCE

The entire disclosure of Japanese Patent Application No. 2009-075903 filed Mar. 26, 2009 is expressly incorporated by reference herein.

BACKGROUND

1. Technical Field

The present invention relates to an information processing device, an arithmetic processing method, an electronic apparatus, and the like.

2. Related Art

In recent years, a processor (in a broad sense, an information processing device) is incorporated in every apparatus in daily use. The processor is required to be small in size, low in cost, low in power consumption, high in function, and high in performance. Various techniques for realizing increases in function and performance of the processor have been examined. As one of the techniques, there is a method of reducing an instruction set of the processor.

The method of reducing the instruction set is equivalent to a technical idea of RISC (Reduced Instruction Set Computer) architecture with respect to a processor having CISC (Complex Instruction Set Computer) architecture. In other words, instructions to be decoded are limited to simple ones and simplified by reducing the instruction set to realize an increase in speed.

When the instruction set is reduced, the number of bits of an operation code representing an instruction can be reduced. Then, there are advantages that the number of bits for designating a register called, for example, operand can be increased to increase the number of registers and arithmetic processing and branching processing can be increased in speed because a maximum value that can be embedded in an instruction as an immediate value is increased.

On the other hand, there are various sizes in numerical values treated by the processor. In an example of the popular C language, data of sizes such as 8 bits (e.g., Char type), 16 bits (e.g., Short type), 32 bits (e.g., int type and long type), and 64 bits (e.g., long type) are treated. When the number of bits increases, a representable data range increases and overflow of an operation result less easily occurs. On the other hand, a capacity of a memory that stores data increases and an increase in circuit size of an arithmetic unit and an increase in power consumption are caused. Therefore, it is desirable that the processor is capable of applying arithmetic processing to data of various sizes and performs processing in data size of the number of bits optimum for the arithmetic processing.

In general, the bit width of an arithmetic unit is fixed in a processor. However, various inventions for efficiently performing arithmetic processing for data having plural bit widths have been proposed. For example, JP-A-8-292876 discloses a technique for dividing an arithmetic logical arithmetic circuit into two to make it possible to simultaneously execute two kinds of arithmetic processing having half-word length. For example, JP-A-10-91439 discloses a processor in which a register having predetermined bit length is divided into two to be capable of operating in parallel.

However, in the technique disclosed in JP-A-8-292876, a computer program or the like needs to explicitly designate "one word" processing or "half ward" processing to instruct execution of only one of these kinds of processing. Similarly, in the technique disclosed in JP-A-10-91439, it is necessary to cause the processor to exclusively operate to process data having predetermined bit length as "one word" or two "half words". Therefore, with the techniques disclosed in JP-A-8-292876 and JP-A-10-91439, code efficiency of a computer program regarded as effective for a reduction in power consumption and a reduction in cost of an apparatus mounted with the processor cannot be improved.

SUMMARY

An advantage of some aspects of the invention is to provide an information processing device, an arithmetic processing method, an electronic apparatus, and the like that improve code efficiency of an instruction set.

According to an aspect of the invention, there is provided an information processing device including: plural input registers including a first input register and a second input register; an added value register; a first adding unit that performs addition processing for stored data of the first input register and stored data of the second input register; a second adding unit that performs addition processing for connected data, which is obtained by connecting the stored data of the first input register and the stored data of the second input register, and stored data of the added value register; and plural output registers in which a processing result of the first adding unit or the second adding unit is stored, wherein, in each of given execution cycles, the first adding unit stores a processing result of the first adding unit in any one of the plural output registers and the second adding unit stores a processing result of the second adding unit in any one of the plural output registers.

According to the aspect of the invention, it is possible to apply kinds of addition processing different from each other to stored data of a common input register. It is possible to obtain results of plural kinds of addition processing applied to stored data of the same input register. As a result, since it is unnecessary to explicitly designate data size of a processing target, it is possible to improve code efficiency and make an instruction for designating the addition processing unnecessary. This means that there is an effect that it is possible to increase difficulty in reading a code, make disassemble difficult to generate a code with high security, and contribute to reverse engineering prevention and improvement of security.

According to another aspect of the invention, there is provided an information processing device including: plural input registers including a first input register, a second input register, a third input register, and a fourth input register; a first adding unit that performs addition processing for stored data of the first input register and stored data of the third input register; a second adding unit that performs addition processing for first connected data, which is obtained by connecting the stored data of the first input register as lower-order data and stored data of the second input register as higher-order data, and second connected data, which is obtained by connecting the stored data of the third input register as lower-order data and stored data of the fourth input register as higher-order data; and plural output registers in which a processing result of the first adding unit or the second adding unit is stored, wherein, in each of given execution cycles, the first adding unit stores a processing result of the first adding unit in any one of the plural output registers and the second adding unit stores a processing result of the second adding unit in any one of the plural output registers.

According to the aspect of the invention, it is possible to apply kinds of addition processing different from each other to stored data of a common input register. It is possible to obtain results of plural kinds of addition processing applied to stored data of the same input register. As a result, since it is unnecessary to explicitly designate data size of a processing target, it is possible to improve code efficiency and make an instruction for designating the addition processing unnecessary. Moreover, it is possible to simultaneously perform addition processing for plural higher-order data and addition processing for plural lower-order data.

According to still another aspect of the invention, there is provided an information processing device including: plural input registers including a first input register, a second input register, a third input register, and a fourth input register; a second adding unit that performs addition processing for first connected data, which is obtained by connecting stored data of the first input register as lower-order data and stored data of the second input register as higher-order data, and second connected data, which is obtained by connecting stored data of the third input register as lower-order data and stored data of the fourth input register as higher-order data; a third adding unit that performs addition processing for the stored data of the second input register and the stored data of the fourth input register; and plural output registers in which a processing result of the second adding unit or the third adding unit is stored, wherein, in each of given execution cycles, the second adding unit stores a processing result of the second adding unit in any one of the plural output registers and the third adding unit stores a processing result of the third adding unit in any one of the plural output registers.

According to the aspect of the invention, it is possible to apply kinds of addition processing different from each other to stored data of a common input register. It is possible to obtain results of plural kinds of addition processing applied to stored data of the same input register. As a result, since it is unnecessary to explicitly designate data size of a processing target, it is possible to improve code efficiency and make an instruction for designating the addition processing unnecessary. This means that there is an effect that it is possible to increase difficulty in reading a code, make disassemble difficult to generate a code with high security, and contribute to reverse engineering prevention and improvement of security.

According to yet another aspect of the invention, there is provided an information processing device including: plural input registers including a first input register, a second input register, a third input register, and a fourth input register; a first adding unit that performs addition processing for stored data of the first input register and stored data of the third input register; a second adding unit; a third adding unit; and plural output registers in which a processing result of any one of the first adding unit, the second adding unit, and the third adding unit is stored, wherein the third adding unit performs addition processing for stored data of the second input register and stored data of the fourth input register, the second adding unit performs addition processing for a processing result of the first adding unit and a processing result of the third adding unit, and, for each of given execution cycles, the first adding unit stores the processing result of the first adding unit in any one of the plural output registers, the second adding unit stores a processing result of the second adding unit in any one of the plural output registers, and the third adding unit stores the processing result of the third adding unit in any one of the plural output registers.

According to the aspect of the invention, it is possible to apply kinds of addition processing different from each other to stored data of a common input register. It is possible to obtain results of plural kinds of addition processing applied to stored data of the same input register. As a result, since it is unnecessary to explicitly designate data size of a processing target, it is possible to improve code efficiency and make an instruction for designating the addition processing unnecessary. This means that there is an effect that it is possible to increase difficulty in reading a code, make disassemble difficult to generate a code with high security, and contribute to reverse engineering prevention and improvement of security.

It is preferable that the information processing device further includes an instruction decoding unit that decodes fetched instruction data, and the processing results of the adding units are stored in any one of the plural output registers irrespectively of a decoding result of the instruction decoding unit. This makes it possible to store the processing results of the adding units in the output registers corresponding thereto in each of the execution cycles irrespectively of a decoding result of the instruction decoding unit. As a result, it is possible to acquire results of plural kinds of addition processing at a time and realize an increase in speed of arithmetic processing.

It is preferable that the instruction decoding unit decodes a data transfer instruction and a branch instruction excluding an arithmetic operation instruction, a logical operation instruction, and a shift operation instruction. This makes it possible to give a margin to a bit field specified by an instruction set and provide an information processing device having extremely high code efficiency. As a result, it is possible to increase difficulty in reading a code, make disassemble difficult to generate a code with high security, and contribute to reverse engineering prevention and improvement of security.

It is preferable that the processing results of the adding units stored in the plural output registers are formed to be transferable to any one of the plural input registers. This makes it possible to serve results of the arithmetic processing performed by the adding units to the arithmetic processing again and perform processing such as branch processing using the arithmetic processing results even if an instruction for designating the arithmetic processing is not issued.

It is preferable that the first adding unit and the second adding unit are configured to be operable in parallel to each other and, when the information processing device includes the third adding unit, the first to third adding units are configured to be operable in parallel to one another.

This makes it possible to simultaneously apply kinds of addition processing different from each other to stored data of a common input register and obtain results of plural kinds of addition processing applied to stored data of the same input register.

According to further another aspect of the invention, there is provided an arithmetic processing method for an information processing device including: plural input registers including a first input register and a second input register; a first adding unit that performs addition processing using stored data of any one of the plural input registers; a second adding unit that performs addition processing using stored data of any one of the plural input registers; and plural output registers in which a processing result of the first adding unit or the second adding unit is stored, the arithmetic processing method including: allocating the first input register and the second input register to the first adding unit out of the plural input registers; allowing the first adding unit to perform addition processing for stored data of the first input register and stored data of the second input register; allowing the second adding unit to perform addition processing for connected data, which is obtained by connecting the stored data of the first input register and the stored data of the second input register, and stored data of an added value register; and, in each of given execution cycles, allowing the first adding unit to store a processing result of the first adding unit in any one of the plural output registers and the second adding unit to store a processing result of the second adding unit in any one of the plural output registers.

It is preferable that the information processing device further includes a third adding unit, the added value register includes a third input register and a fourth input register, and the arithmetic processing method further includes: allocating the third input register and the fourth input register to the third adding unit out of the plural input registers; allowing the third adding unit to perform addition processing for stored data of the third input register and stored data of the fourth input register; and, in each of the execution cycles, allowing the third adding unit to store a processing result of the third adding unit in any one of the plural output registers.

According to a further aspect of the invention, there is provided an arithmetic processing method for an information processing device including: plural input registers including a first input register, a second input register, a third input register, and a fourth input register; a first adding unit that performs addition processing using stored data of any one of the plural input registers; a second adding unit that performs addition processing using stored data of any one of the plural input registers; and plural output registers in which a processing result of the first adding unit or the second adding unit is stored, the arithmetic processing method including: allocating the first input register and the third input register to the first adding unit and allocating the second input register and the fourth input register to the second adding unit out of the plural input registers; allowing the first adding unit to perform addition processing for stored data of the first input register and stored data of the third input register; allowing the second adding unit to perform addition processing for first connected data, which is obtained by connecting the stored data of the first input register as lower-order data and stored data of the second input register as higher-order data, and second connected data, which is obtained by connecting the stored data of the third input register as lower-order data and stored data of the fourth input register as higher-order data; and, in each of given execution cycles, allowing the first adding unit to store a processing result of the first adding unit in any one of the plural output registers and the second adding unit to store a processing result of the second adding unit in any one of the plural output registers.

This makes it possible to apply kinds of addition processing different from each other to stored data of a common input register and obtain results of plural kinds of addition processing applied to stored data of the same input register. As a result, since it is unnecessary to explicitly designate data size of a processing target, it is possible to improve code efficiency and make an instruction for designating the addition processing unnecessary. Consequently, it is possible to increase difficulty in reading a code, make disassemble difficult to generate a code with high security, and contribute to reverse engineering prevention and improvement of security.

It is preferable that the information processing device further includes an instruction decoding unit that decodes fetched instruction data, and the information processing method further includes storing the processing results of the adding units in any one of the plural output registers irrespectively of a decoding result of the instruction decoding unit.

The processing results of the adding units are stored in the output registers corresponding thereto in each of the execution cycles irrespectively of a decoding result of the instruction decoding unit. This makes it possible to acquire results of plural kinds of addition processing at a time and realize an increase in speed of arithmetic processing.

According to a still further aspect of the invention, there is provided an electronic apparatus including: a memory that stores a computer program and data; and the information processing device according to any one of the aspects that performs arithmetic processing corresponding to the computer program and the data.

According to the aspect of the invention, it is possible to provide an electronic apparatus to which an information processing device that improves code efficiency of an instruction set is applied. As a result, it is possible to contribute to a reduction in cost of the electronic apparatus.

BRIEF DESCRIPTION OF THE DRAWINGS

The invention will be described with reference to the accompanying drawings, wherein like numbers reference like elements.

FIG. 8 is a diagram for explaining a processing example of the arithmetic processor shown in FIG. 6 or 7.

FIG. 10 is a diagram for explaining an example of an instruction set of the CPU according to the first embodiment.

FIG. 14 is a diagram of an example of a computer program of the CPU according to the second embodiment for realizing the processing shown in FIG. 12.

FIG. 15 is a diagram of an example of a general computer program of the CPU for realizing the processing shown in FIG. 12.

DESCRIPTION OF EXEMPLARY EMBODIMENTS

Embodiments of the invention are explained in detail below with reference to the accompanying drawings. The embodiments explained below do not unreasonably limit the content of the invention described in claims. All components explained below are not always elements essential for solving the problems of the invention.

1. Information Processing Device

First Embodiment

Figure 1:
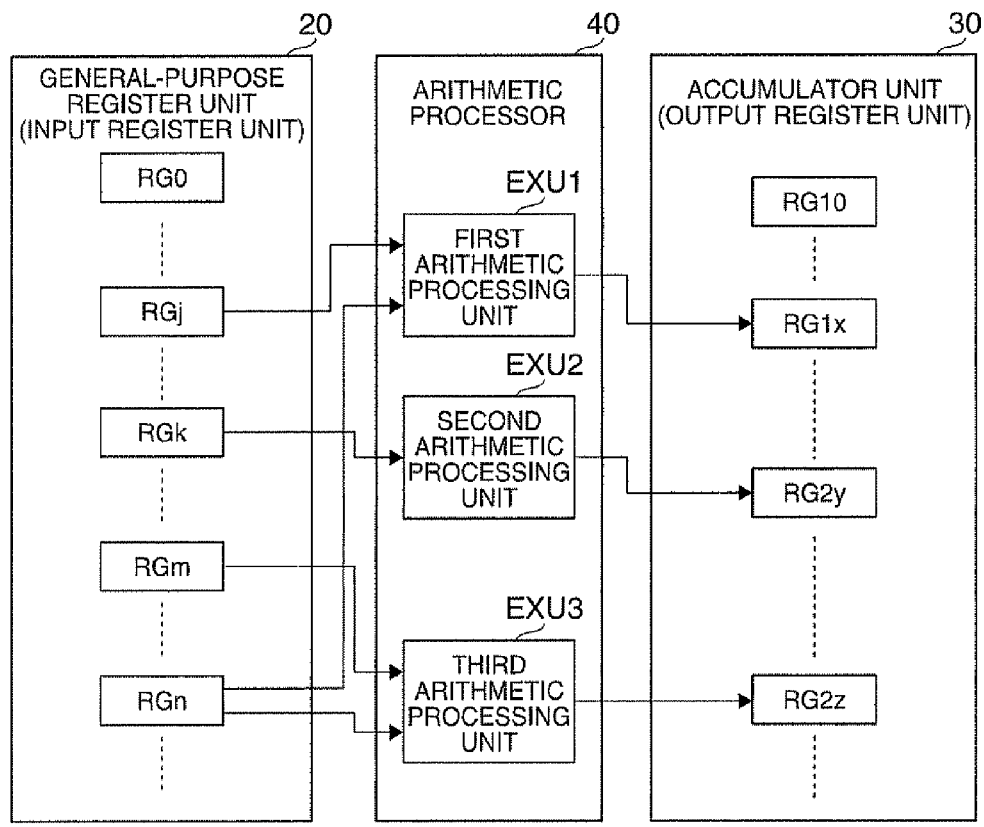
FIG. 1 is a diagram of a principle configuration example of an information processing device according to a first embodiment of the invention.

A principle configuration example of an information processing device according to a first embodiment of the invention is shown in FIG. 1.

An information processing device 10 according to the first embodiment includes a general-purpose register unit 20, an accumulator unit 30, and an arithmetic processor 40.

The general-purpose register unit (an input register unit) 20 includes plural general-purpose registers RG0, ..., RGj, ..., RGk, ..., RGm, ..., RGn, and the like from which stored data can be read out from the outside and in which stored data can be written from the outside. Input data served to arithmetic processing performed by the arithmetic processor 40 is set in the general-purpose register unit 20. The plural general-purpose registers of the general-purpose register unit 20 have a function of an input register in which input data of the arithmetic processor 40 is set.

The accumulator unit (an output register unit) 30 includes plural accumulators RG10, ..., RG1$x$, ..., RG2$y$, ..., RG3$z$, and the like in which a processing result of the arithmetic processing performed by the arithmetic processor 40 is stored. The plural accumulators of the accumulator unit 30 have a function of an output register in which a processing result of the arithmetic processor 40 is stored.

The arithmetic processor 40 includes plural arithmetic processing units configured to be operable in parallel to each other. The plural arithmetic processing units may perform different kinds of processing from one another or one arithmetic processing unit may perform arithmetic processing of the same kind as arithmetic processing of the other arithmetic processing units. The arithmetic processing units included in the plural arithmetic processing units of the arithmetic processor 40 desirably perform so-called arithmetic operation, logical operation, or shift operation. The arithmetic operation is desirably any one of addition, multiplication, subtraction, division, increment operation, and decrement operation. The logical operation is desirably any one of OR operation, AND operation, NOT operation, exclusive OR operation, and exclusive NOR operation. The shift operation is desirably any one of logical shift operation, arithmetic shift operation, rotational operation, and swap operation.

One or plural general-purpose registers among the plural general-purpose registers of the general-purpose register unit 20 are allocated to the arithmetic processing units included in the plural arithmetic processing units of the arithmetic processor 40. One or plural accumulators among the plural accumulators of the accumulator unit 30 are also allocated to the arithmetic processing units. In each of given execution cycles, the plural arithmetic processing units simultaneously perform the arithmetic processing using input data set in the general-purpose registers allocated to each of the arithmetic processing units and store processing results of the arithmetic processing in the accumulators allocated to each of the arithmetic processing units.

Specifically, the arithmetic processor 40 includes at least a first arithmetic processing unit EXU1 that performs first arithmetic processing and a second arithmetic processing unit EXU2 that performs second arithmetic processing. Processing content of the first arithmetic processing may be the same as or different from processing content of the second arithmetic processing. The plural general-purpose registers (input registers) include first general-purpose registers (input registers) RGj and RGn allocated to the first arithmetic processing unit EXU1 and a second general-purpose register (input register) RGk allocated to the second arithmetic processing unit EXU2. The plural accumulators (output registers) include a first accumulator (output register) RG1$x$ allocated to the first arithmetic processing unit EXU1 and a second accumulator (output register) RG2$y$ allocated to the second arithmetic processing unit EXU2. In the information processing device 10, in each of the execution cycles, the first arithmetic processing unit EXU1 performs the first arithmetic processing using stored data of the first general-purpose registers RGj and RGn and stores a processing result of the first arithmetic processing in the first accumulator RG1$x$. The second arithmetic processing unit EXU2 performs the second arithmetic processing using stored data of the second general-purpose register RGk and stores a processing result of the second arithmetic processing in the second accumulator RG2$y$.

The plural accumulators including the first accumulator RG1$x$ may be allocated to the first arithmetic processing unit EXU1. Similarly, the plural accumulators including the second accumulator RG2$y$ may be allocated to the second arithmetic processing unit EXU2.

Specifically, as an arithmetic processing method of the information processing device 10, a first input register among the plural input registers is allocated to the first arithmetic processing unit EXU1, a second input register among the plural input registers is allocated to the second arithmetic processing unit EXU2, a first output register among the plural output registers is allocated to the first arithmetic processing unit EXU1, and a second output register among the plural output registers is allocated to the second arithmetic processing unit EXU2. In each of the given execution cycles, the first arithmetic processing unit EXU1 performs the first arithmetic processing using stored data of the first input register and stores a processing result of the first arithmetic processing in the first output register. The second arithmetic unit EXU2 performs the second arithmetic processing using stored data of the second input register and stores a processing result of the second arithmetic processing in the second output register.

Such an information processing device 10 repeats, in each of the execution cycles, storing a result obtained by performing the arithmetic processing using the stored data of the general-purpose registers in the accumulators. This makes it possible to make an instruction for designating the arithmetic processing unnecessary, give a margin to a bit field specified by an instruction set, and realize an information processing device having extremely high code efficiency.

The stored data of the first accumulator and the stored data of the second accumulator are formed to be transferable to any one of the plural general-purpose registers. Consequently, a result of the arithmetic processing performed by the arithmetic processor 40 can be served to the arithmetic processing again. Therefore, it is possible to perform processing such as branch processing using the arithmetic processing result even if an instruction for designating the arithmetic processing is not issued.

The first general-purpose register may be allocated to the second arithmetic processing unit EXU2. The second arithmetic processing unit EXU2 may perform, in each of the execution cycles, the second arithmetic processing using the stored data of the first general-purpose register and store a processing result of the second arithmetic processing in the second accumulator. Consequently, when plural kinds of arithmetic processing are performed by using data set in one general-purpose register, the arithmetic processing can be performed at a time and an increase in speed of processing can be realized.

In FIG. 1, the arithmetic processor 40 includes a third arithmetic processing unit EXU3 that is configured to be operable in parallel to the first arithmetic processing unit EXU1 and the second arithmetic processing unit EXU2 and performs third arithmetic processing. A general-purpose register common to at least one of the first arithmetic processing unit EXU1 and the second arithmetic processing unit EXU2 is allocated to the third arithmetic processing unit EXU3. A result of the third arithmetic processing is stored in an accumulator allocated to the third arithmetic processing unit EXU3.

Figure 2:
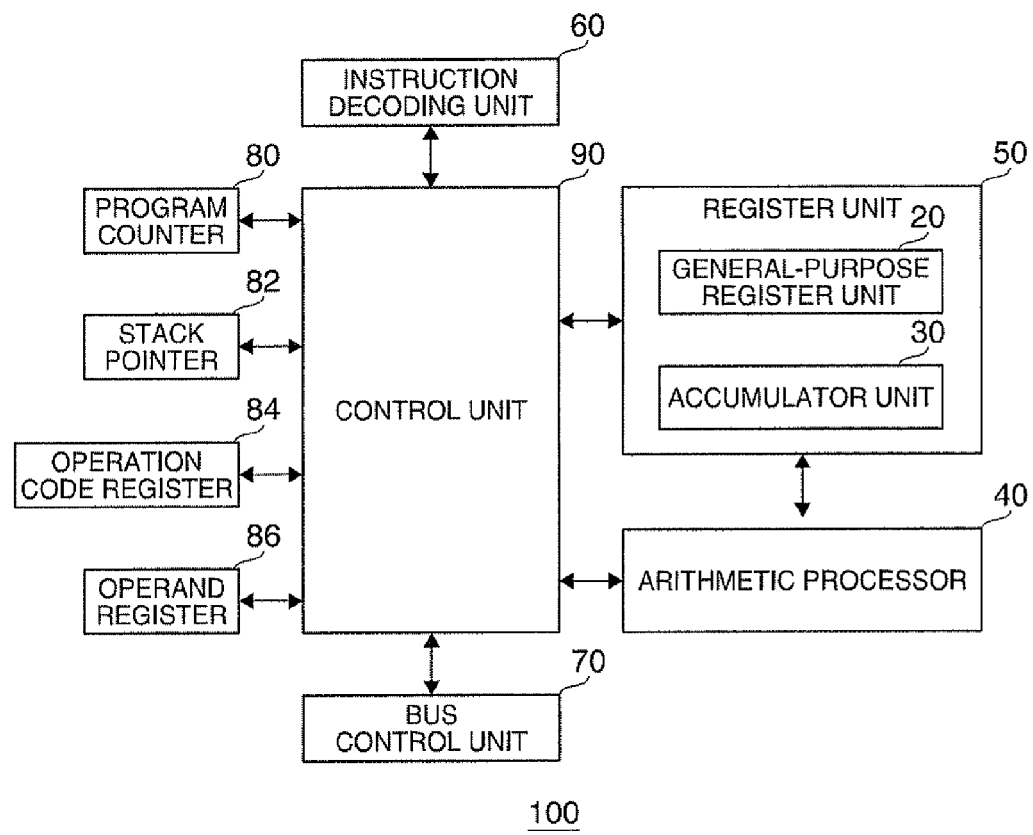
FIG. 2 is a block diagram of a configuration example of a CPU as the information processing device shown in FIG. 1.

A block diagram of a configuration example of a central processing unit (CPU) as the information processing device 10 shown in FIG. 1 is shown in FIG. 2. In FIG. 2, components same as those shown in FIG. 1 are denoted by the same reference numerals and explanation of the components is omitted as appropriate.

Figure 3:
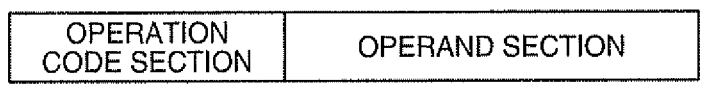
FIG. 3 is a diagram for explaining instruction data of a computer program read by the CPU shown in FIG. 2.

A diagram for explaining instruction data of a computer program read by the CPU 100 shown in FIG. 2 is shown in FIG. 3.

The CPU 100 includes a register unit 50 including the general-purpose register unit 20 and the accumulator unit 30, an instruction decoding unit 60, a bus control unit 70, a program counter (PC) 80, a stack pointer (SP) 82, an operation code register 84, an operand register 86, and a control unit 90.

The CPU 100 reads a computer program stored in a not-shown memory on the outside or the inside of the CPU 100 and executes processing designated by the computer program. The computer program is a sequence of instruction data shown in FIG. 3, each designating processing content of the CPU 100. The instruction data has an operation code section and an operand section. The operation code section is a section for designating the processing content. The operand section is a section for designating a target of the processing designated by the operation code section.

The program counter 80 is a control register that stores an address of a computer program currently executed by the CPU 100. Content of the program counter 80 is updated every time the CPU 100 ends execution of processing. The stack pointer 82 is a control register that stores an address saved in a save area for data, which is called a stack area, last. The stack pointer 82 is used for, for example, suspending present processing when the present processing shifts to sub-routine processing and resuming the suspended processing after the end of the sub-routine processing. The operation code register 84 is a control register that stores an operation code section of instruction data fetched by the CPU 100. The operand register 86 is a control register that stores an operand section of the instruction data fetched by the CPU 100.

When instruction data of a computer program stored in an address designated by the program counter 80 is fetched by the CPU 100, the instruction decoding unit 60 decodes the instruction data and outputs a decoding result to the control unit 90.

The bus control unit 70 performs arbitration control for a bus provided on the outside or the inside of the CPU 100 and performs access control according to an instruction from the control unit 90.

The control unit 90 controls the program counter 80, the stack pointer 82, the operation code register 84, the operand register 86, the bus control unit 70, the arithmetic processor 40, and the register unit 50 on the basis of a decoding result from the instruction decoding unit 60 and manages the control of the CPU 100.

Figure 4:
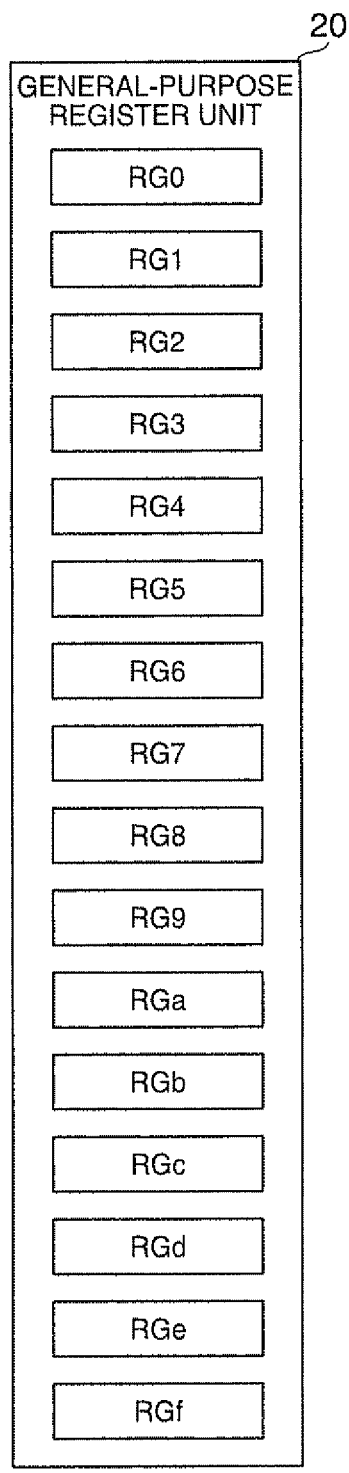
FIG. 4 is a diagram of a configuration example of a general-purpose register unit shown in FIG. 2.

A configuration example of the general-purpose register unit 20 shown in FIG. 2 is shown in FIG. 4.

In the first embodiment, the general-purpose register unit 20 includes sixteen kinds of general-purpose registers RG0 to RGf. In the first embodiment, the CPU 100 is explained as including sixteen kinds of general-purpose registers. However, the invention is not limited by the number of general-purpose registers. The CPU 100 only has to include plural general-purpose registers. Further, in the first embodiment, the number of bits of a general-purpose register is explained as "16". However, the invention is not limited to this and is not limited by the number of bits of the general-purpose register.

The general-purpose registers shown in FIG. 4 are configured to be accessible from the control unit 90. The control unit 90 can write data in the general-purpose registers and read out data from the general-purpose registers. Any one of the general-purpose registers RG0 to RGf shown in FIG. 4 is allocated in advance to any one of the plural arithmetic processing units of the arithmetic processor 40. Among the general-purpose registers RG0 to RGf, a general-purpose register allocated to none of the plural arithmetic processing units of the arithmetic processor 40 may be present. One general-purpose register may be allocated to the plural arithmetic processing units of the arithmetic processor 40.

Figure 5:
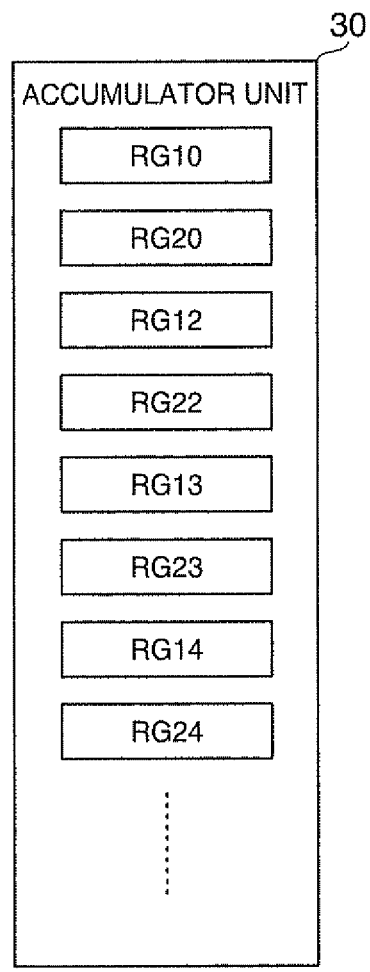
FIG. 5 is a diagram of a configuration example of an accumulator unit shown in FIG. 2.

A configuration example of the accumulator unit 30 shown in FIG. 2 is shown in FIG. 5.

In the first embodiment, the accumulator unit 30 includes, for example, thirty-two or more kinds of accumulators RG10, . . . , RG2f, and the like. In the first embodiment, the invention is not limited by the number of the accumulators. The CPU 100 only has to include plural accumulators. Further, in the first embodiment, the number of bits of an accumulator is explained as "16". However, the invention is not limited to this. The invention is not limited by the number of bits of the accumulator.

The accumulators shown in FIG. 5 are configured to be writable from the arithmetic processing units of the arithmetic processor 40. The control unit 90 can read out data written in the accumulators and transfer the data to any one of the general-purpose registers of the general-purpose register unit 20. Any one of the accumulators shown in FIG. 5 is allocated in advance to any one of the plural arithmetic processing units of the arithmetic processor 40. Among the accumulators, an accumulator allocated to none of the plural arithmetic processing units of the arithmetic processor 40 may be present.

The arithmetic processing units included in the plural arithmetic processing units of the arithmetic processor 40 perform, in each of the execution cycles, the arithmetic processing using data of the general-purpose registers allocated thereto as the input registers and store results of the arithmetic processing in the accumulators allocated thereto as the output registers.

Figure 6:
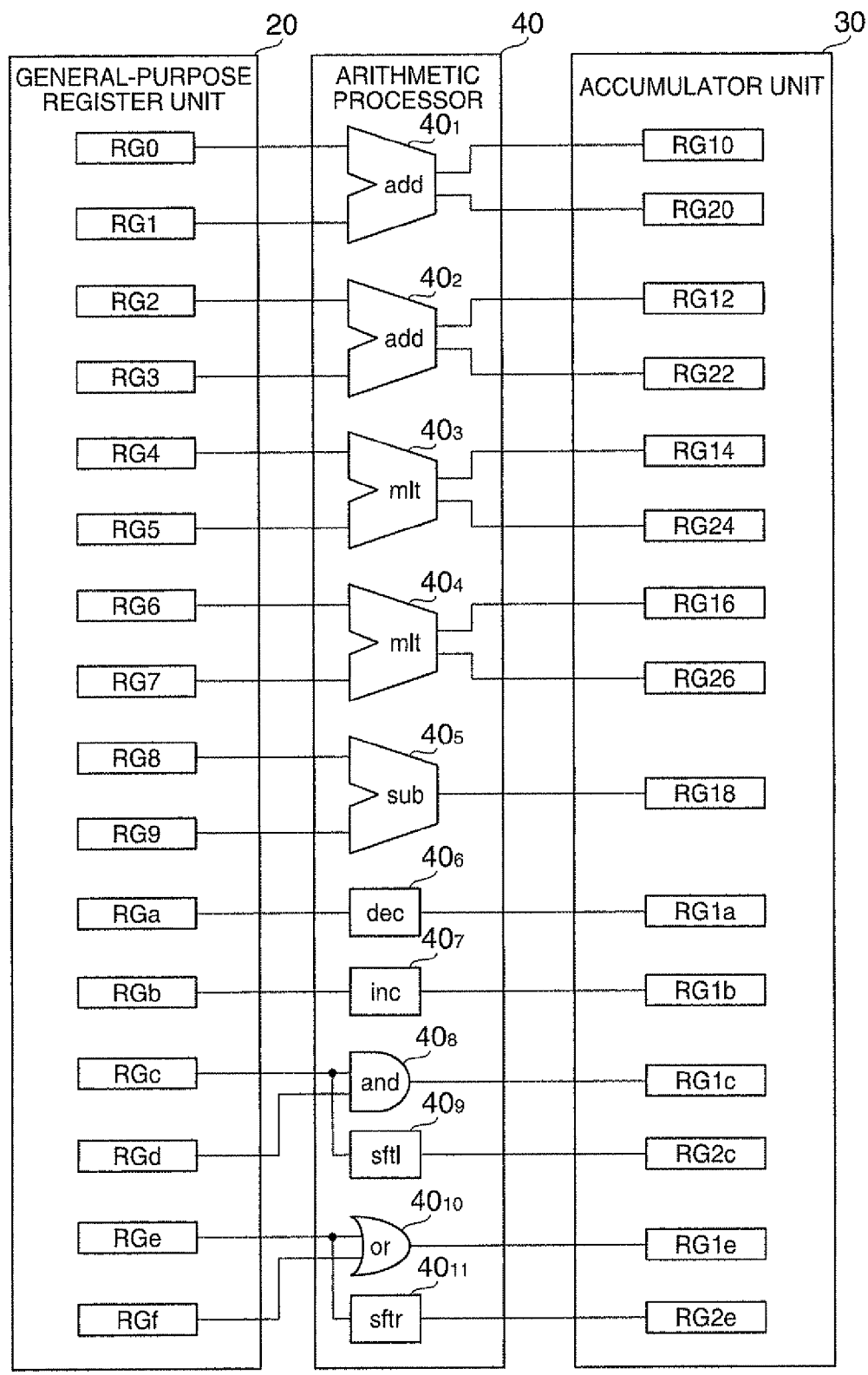
FIG. 6 is a block diagram of a configuration example of the general-purpose register unit, an arithmetic processor, and the accumulator unit according to the first embodiment.

A block diagram of a configuration example of the general-purpose register unit 20, the arithmetic processor 40, and the accumulator unit 30 according to the first embodiment is shown in FIG. 6. In FIG. 6, components same as those shown in FIGS. 4 and 5 are denoted by the same reference numerals and signs and explanation of the components is omitted as appropriate.

Figure 7:
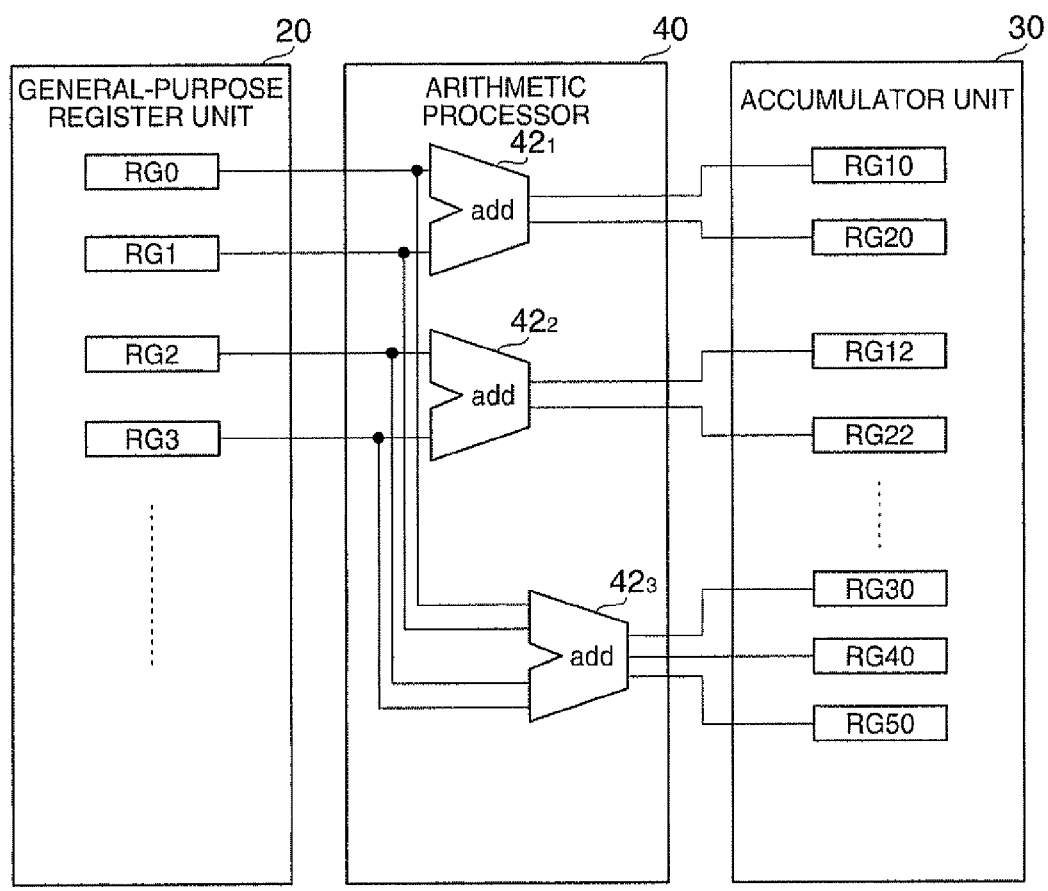
FIG. 7 is a block diagram of another configuration example of the general-purpose register unit, the arithmetic processor, and the accumulator unit according to the first embodiment.

A block diagram of another configuration example of the general-purpose register unit 20, the arithmetic processor 40, and the accumulator unit 30 according to the first embodiment is shown in FIG. 7. In FIG. 7, components same as those shown in FIG. 6 are denoted by the same reference numerals and signs and explanation of the components is omitted as appropriate.

A diagram for explaining a processing example of the arithmetic processor 40 shown in FIG. 6 or 7 is shown in FIG. 8.

The arithmetic processor 40 includes plural arithmetic processing units. In FIG. 6, only arithmetic processing units $40_1$ to $40_{11}$ are shown. An example in which the arithmetic processor 40 includes eleven arithmetic processing units is explained with reference to FIG. 6. However, the invention is not limited by the number of arithmetic processing units. The arithmetic processor 40 only has to include plural arithmetic processing units.

The arithmetic processing unit $40_1$ performs addition processing. The general-purpose registers RG0 and RG1 and the accumulators RG10 and RG20 are allocated to the arithmetic processing unit 40. In each of the execution cycles, the arithmetic processing unit $40_1$ performs, in parallel to the arithmetic processing units $40_2$ to $40_{11}$ addition of input data of the general-purpose register RG0 and input data of the general-purpose register RG1 and stores a result of the addition in the accumulators RG10 and RG20. A lower-order bit side of the addition result is stored in the accumulator RG10 and a carry bit is stored in the accumulator RG20.

The arithmetic processing unit $40_2$ also performs addition processing. However, general-purpose registers different from those for the arithmetic processing unit $40_1$ are allocated to the arithmetic processing unit $40_2$ as input registers. Specifically, the general-purpose registers RG2 and RG3 and the accumulators RG12 and RG22 are allocated to the arithmetic processing unit $40_2$. In each of the execution cycles, the arithmetic processing unit $40_2$ performs, in parallel to the arithmetic processing units $40_1$ and $40_3$ to $40_{11}$, addition of input data of the general-purpose register RG2 and input data of the general-purpose register RG3 and stores a result of the addition in the accumulators RG12 and RG22. A lower-order bit side of the addition result is stored in the accumulator RG12 and a carry bit is stored in the accumulator RG22.

The arithmetic processing unit $40_3$ performs multiplication processing. The general-purpose registers RG4 and RG5 and the accumulators RG14 and RG24 are allocated to the arithmetic processing unit $40_3$. In each of the execution cycles, the arithmetic processing unit $40_3$ performs, in parallel to the arithmetic processing units $40_1$ to $40_2$ and $40_4$ to $40_{11}$, multiplication of input data of the general-purpose register RG4 and input data of the general-purpose register RG5 and stores a result of the multiplication in the accumulators RG14 and RG24. A lower-order bit side of the multiplication result is stored in the accumulator RG14 and a higher-order bit side of the multiplication result is stored in the accumulator RG24.

The arithmetic processing unit $40_4$ also performs multiplication processing. The general-purpose registers RG6 and RG7 and the accumulators RG16 and RG26 are allocated to the arithmetic processing unit $40_4$. In each of the execution cycles, the arithmetic processing unit $40_4$ performs, in parallel to the arithmetic processing units $40_1$ to $40_3$ and $40_5$ to $40_{11}$, multiplication of input data of the general-purpose register RG6 and input data of the general-purpose register RG7 and stores a result of the multiplication in the accumulators RG16 and RG26. A lower-order bit side of the multiplication result is stored in the accumulator RG16 and a higher-order bit side of the multiplication result is stored in the accumulator RG26.

The arithmetic processing unit $40_5$ performs subtraction processing. The general-purpose registers RG8 and RG9 and the accumulator RG18 are allocated to the arithmetic processing unit $40_5$. In each of the execution cycles, the arithmetic processing unit $40_5$ performs, in parallel to the arithmetic processing units $40_1$ to $40_4$ and $40_6$ to $40_{11}$, subtraction for subtracting input data of the general-purpose register RG8 from input data of the general-purpose register RG9 and stores a result of the subtraction in the accumulator RG18.

The arithmetic processing unit $40_6$ performs decrement operation processing. The general-purpose register RGa and the accumulator RG1a are allocated to the arithmetic processing unit $40_6$. In each of the execution cycles, the arithmetic processing unit $40_6$ performs, in parallel to the arithmetic processing units $40_1$ to $40_5$ and $40_7$ to $40_{11}$, decrement operation with 1 subtracted from input data of the general-purpose register RGa and stores a result of the decrement operation in the accumulator RG1a.

The arithmetic processing unit $40_7$ performs increment operation processing. The general-purpose register RGb and the accumulator RG1b are allocated to the arithmetic processing unit $40_7$. In each of the execution cycles, the arithmetic processing unit $40_7$ performs, in parallel to the arithmetic processing units $40_1$ to $40_6$ and $40_8$ to $40_{11}$, increment operation with 1 added to input data of the general-purpose register RGb and stores a result of the increment operation in the accumulator RG1b.

The arithmetic processing unit $40_8$ performs AND operation processing. The general-purpose registers RGc and RGd and the accumulator RG1c are allocated to the arithmetic processing unit $40_8$. In each of the execution cycles, the arithmetic processing unit $40_8$ performs, in parallel to the arithmetic processing units $40_1$ to $40_7$ and $40_9$ to $40_{11}$, AND operation of input data of the general-purpose register RGc and input data of the general-purpose register RGd and stores a result of the AND operation in the accumulator RG1c.

The arithmetic processing unit $40_9$ performs logical shift operation processing in the left direction. The general-purpose register RGc and the accumulator RG2c are allocated to the arithmetic processing unit $40_9$. In each of the execution cycles, the arithmetic processing unit $40_9$ performs, in parallel to the arithmetic processing units $40_1$ to $40_8$, $40_{10}$, and $40_{11}$, shift operation with input data of the general-purpose register RGc shifted in the left direction and stores a result of the shift operation in the accumulator RG2c.

The arithmetic processing unit $40_{10}$ performs OR operation processing. The general-purpose registers RGe and RGf and the accumulator RG1e are allocated to the arithmetic processing unit $40_{10}$. In each of the execution cycles, the arithmetic processing unit $40_{10}$ performs, in parallel to the arithmetic processing units $40_1$ to $40_9$ and $40_{11}$, OR operation of input data of the general-purpose register RGe and input data of the general-purpose register RGf and stores a result of the OR operation in the accumulator RG1e.

The arithmetic processing unit $40_{11}$ performs logical shift operation processing in the right direction. The general-purpose register RGe and the accumulator RG2e are allocated to the arithmetic processing unit $40_{11}$. In each of the execution cycles, the arithmetic processing unit $40_{11}$ performs, in parallel to the arithmetic processing units $40_1$ to $40_{10}$, shift operation with input data of the general-purpose register RGe shifted in the right direction and stores a result of the shift operation in the accumulator RG2e.

The arithmetic processing units 40₁ to 40₁₁ of the arithmetic processor 40 shown in FIG. 6 respectively update values of the accumulators corresponding thereto in each of the execution cycles. Specifically, irrespectively of a decoding result of the instruction decoding unit 60, the arithmetic processing units 40₁ to 40₁₁ respectively perform arithmetic processing in each of the execution cycles. Therefore, when input data of the general-purpose registers allocated thereto are rewritten before the execution cycle, data stored in the accumulators corresponding thereto change after the execution cycle.

On the other hand, the arithmetic processor 40 shown in FIG. 7 can include arithmetic processing units 42₁ to 42₃ besides the arithmetic processing units 40₁ to 40₁₁ shown in FIG. 6. The arithmetic processing units 42₁ and 42₂ may be the arithmetic processing units 40₁ and 40₂ shown in FIG. 6. The arithmetic processing units 42₁ and 42₂ perform addition processing for plural data having 16-bit length, which is bit length of the general-purpose registers. The arithmetic processing unit 42₃ performs addition processing for plural data having 32-bit length, which is bit length twice as large as the bit length of the general-purpose registers.

The general-purpose registers RG0 and RG1 (the first input register and the second input register) and the accumulators RG10 and RG20 are allocated to the arithmetic processing unit 42₁ (a first adding unit). In each of the execution cycles, the arithmetic processing unit 42₁ performs, in parallel to the arithmetic processing units 42₂ and 42₃, 16-bit addition processing for input data of the general-purpose registers RG0 and RG1 and stores a result of the addition processing in the accumulators RG10 and RG20. A lower-bit side of the addition processing result is stored in the accumulator RG10.

The general-purpose registers RG2 and RG3 (the third input register and the fourth input register) and the accumulators RG12 and RG22 are allocated to the arithmetic processing unit 42₂ (a third adding unit). In each of the execution cycles, the arithmetic processing unit 42₂ performs, in parallel to the arithmetic processing units 42₁ and 42₃, 16-bit addition processing for input data of the general-purpose registers RG2 and RG3 and stores a result of the addition processing in the accumulators RG12 and RG22. A lower-bit side of the addition processing result is stored in the accumulator RG12.

The general-purpose registers RG0 and RG1 and the accumulators RG30, RG40, and RG50 are allocated to the arithmetic processing unit 42₃ (a second adding unit). In each of the execution cycles, the arithmetic processing unit 42₃ performs, in parallel to the arithmetic processing units 42₁ and 42₃, 32-bit addition processing for data, which is obtained by connecting input data of the general-purpose registers RG0 and RG1, and data of given added value registers and stores a result of the addition processing in the accumulators RG30, RG40, and RG50. In FIG. 7, the general-purpose registers RG2 and RG3 of the general-purpose register unit 20 are allocated to the arithmetic processing unit 42₃ as the added value registers. The arithmetic processing unit 42₃ performs addition of 32-bit data (connected data), which is obtained by connecting input data of the general-purpose register RG0 as a lower-order bit and input data of the general-purpose register RG1 as a higher-order bit, and 32-bit data (connected data), which is obtained by connecting input data of the general-purpose register RG2 as a lower-order bit and input data of the general-purpose register RG3 as a higher-order bit. A lower-order bit of the addition processing result is stored in the accumulator RG30, an intermediate-order bit of the addition processing result is stored in the accumulator RG40, and a higher-order bit of the addition processing result is stored in the accumulator RG50.

In each of the execution cycles, the arithmetic processing unit 42₁ stores the 16-bit addition processing result in the general-purpose registers RG10 and RG20. The arithmetic processing unit 42₂ stores the 32-bit addition processing result in the general-purpose registers RG30, RG40, and RG50. In each of the execution cycles, the arithmetic processing unit 42₂ also stores the 16-bit addition processing result in the general-purpose registers RG12 and RG22.

With such a configuration, it is possible to simultaneously apply kinds of arithmetic processing different from each other to stored data of a common general-purpose register and simultaneously obtain results of plural kinds of arithmetic processing applied to stored data of the same general-purpose register. As a result, since it is unnecessary to explicitly designate data size of a processing target, it is possible to improve code efficiency and make an instruction for designating the addition processing unnecessary. This means that there is an effect that it is possible to increase difficulty in reading a code, make disassemble difficult to generate a code with high security, and contribute to reverse engineering prevention and improvement of security.

Figure 9A:
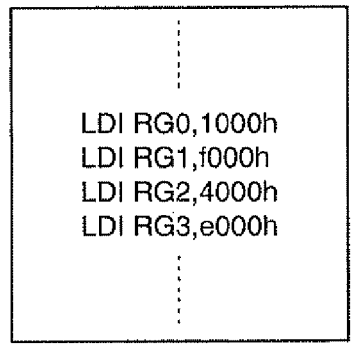
FIGS. 9A and 9B are diagrams for explaining an operation example of the CPU shown in FIG. 2.
Figure 9B:
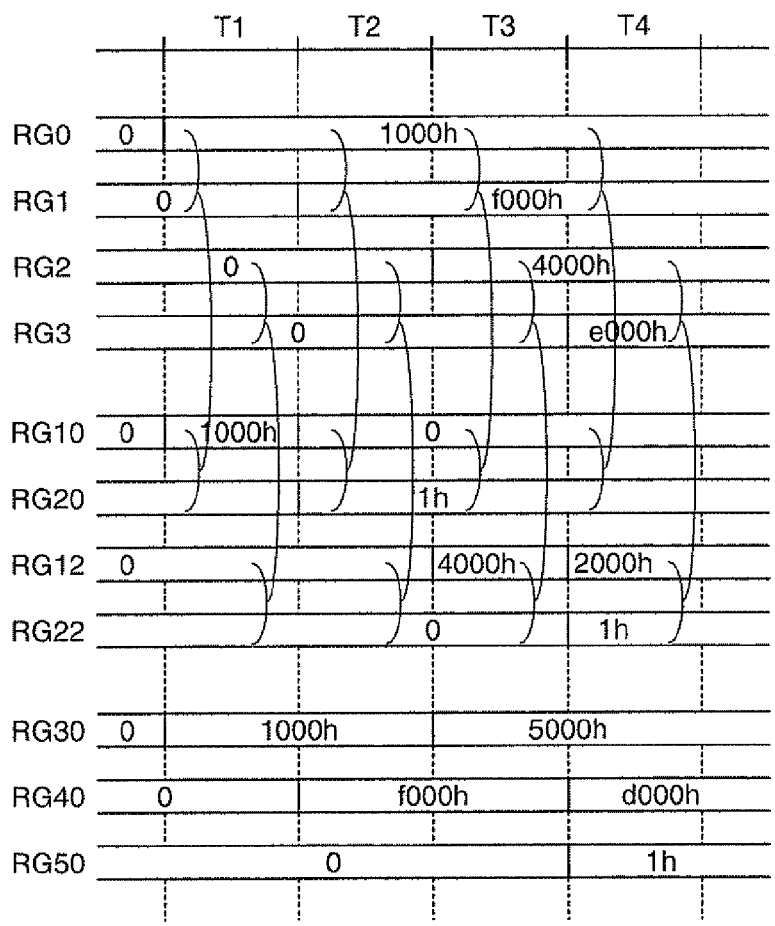

Diagrams for explaining an operation example of the CPU 100 shown in FIG. 2 are shown in FIGS. 9A and 9B. FIG. 9A is a diagram of an example of a computer program of the CPU 100. It is assumed that the CPU 100 has the configuration shown in FIG. 7. In FIG. 9A, an instruction LDI is a transfer instruction for transferring a designated immediate value to a general-purpose register. FIG. 9B is a timing chart of the operation example of the CPU 100. States of the general-purpose registers and the accumulators are schematically shown in FIG. 9B with a delay due to arithmetic operation neglected.

For example, as shown in FIG. 9A, immediate values "1000h" ("h" means a hexadecimal number), "f000h", "4000h", and "e000h" are respectively transferred to the general-purpose registers RG0, RG1, RG2, and RG3. A processing example of the arithmetic processing units 42₁ and 42₂ is examined. It is assumed that, immediately before this data transfer instruction sequence, the general-purpose registers RG0, RG1, RG2, and RG3 and the accumulators RG10, RG20, RG12, RG22, RG30, RG40, and RG50 are initialized and data of the general-purpose registers and the accumulators are "0".

First, in an execution cycle T1, the immediate value "1000h" is set in the general-purpose register RG0. According to the setting, in the execution cycle T1, the arithmetic processing unit 42₁ sets, in the accumulator RG10, an addition result "1000h" obtained by adding up "1000h" set in the general-purpose register RG0 and "0" set in the general-purpose register RG1. At this point, data of the accumulator RG20 is kept. Similarly, the arithmetic processing unit 42₂ sets, in the accumulator RG12, an addition result "0" obtained by adding up "0" set in the general-purpose register RG2 and "0" set in the general-purpose register RG3. However, data of the accumulator RG12 is kept. At this point, data of the accumulator RG22 is kept. The arithmetic processing unit 42₃ connects stored data of the general-purpose registers RG0 and RG1 and performs addition processing for the connected stored data and connected data of stored data of the general-purpose registers RG2 and RG3. Therefore, "1000h" is set in the accumulator RG30. "0" set in the accumulators RG40 and RG50 is kept.

Subsequently, in an execution cycle T2, the immediate value "f000h" is set in the general-purpose register RG1.

According to the setting, in the execution cycle T2, the arithmetic processing unit $42_1$ sets, in the accumulators RG10 and RG20, an addition result "10000h" obtained by adding up "1000h" set in the general-purpose register RG0 and "f000h" set in the general-purpose register RG1. More specifically, "0h" is set in the accumulator RG10 and "1h" is set in the accumulator 20. On the other hand, since the data of the general-purpose registers RG2 and RG3 are kept, the arithmetic processing unit $42_2$ sets the addition result in the accumulator RG12. However, the data of the accumulator RG12 is kept. At this point, the data of the accumulator RG22 is kept. The arithmetic processing unit $42_3$ connects stored data of the general-purpose registers RG0 and RG1 and performs addition processing for the connected stored data and connected data of stored data of the general-purpose registers RG2 and RG3. Therefore, "f0001000h" is set in the accumulators RG30 and RG40, "1000h" is set in the accumulator RG30, and "f000h" is set in the accumulator RG40.

In an execution cycle T3, the immediate value "4000h" is set in the general-purpose register RG2. According to the setting, in the execution cycle T3, since data of the general-purpose registers RG0 and RG1 are kept, the data of the accumulators RG10 and RG20 are also kept. On the other hand, the arithmetic processing unit $42_2$ sets, in the accumulator RG12, an addition result "4000h" obtained by adding up "4000h" set in the general-purpose register RG2 and "0" set in the general-purpose register RG3. At this point, the data of the accumulator RG22 is kept. The arithmetic processing unit $42_3$ connects stored data of the general-purpose registers RG0 and RG1 and performs addition processing for the connected stored data and connected data of stored data of the general-purpose registers RG2 and RG3. Therefore, "f0005000h" is set in the accumulators RG30 and RG40, "5000h" is set in the accumulator RG30, and "f000h" is set in the accumulator RG40.

In an execution cycle T4, the immediate value "e000h" is set in the general-purpose register RG3. According to the setting, in the execution cycle T4, since the data of the general-purpose registers RG0 and RG1 are kept, the data of the accumulators RG10 and RG20 are also kept. On the other hand, the arithmetic processing unit $42_2$ sets, in the accumulators RG12 and RG22, an addition result "12000h" obtained by adding up "4000h" set in the general-purpose register RG2 and "e000h" set in the general-purpose register RG3. More specifically, "2000h" is set in the accumulator RG12 and "1h" is set in the accumulator RG22. The arithmetic processing unit $42_3$ connects stored data of the general-purpose registers RG0 and RG1 and performs addition processing for the connected stored data and connected data of stored data of the general-purpose registers RG2 and RG3. Therefore, "1d0005000h" is set in the accumulators RG30, RG40, and RG50, "5000h" is set in the accumulator RG30, "d000h" is set in the accumulator RG40, and "1h" is set in the accumulator RG50.

In this way, even if an addition instruction is not included in an instruction sequence of a computer program, it is possible to obtain an addition result having different bit length in each of the execution cycles simply by setting data in the general-purpose registers allocated as the input registers. Specifically, the CPU 100 does not need to have, in an operation code, an arithmetic operation instruction, a logical operation instruction, and a shift operation instruction corresponding to the arithmetic processing performed by the arithmetic processing units $42_1$ to $42_3$ of the arithmetic processor 40. It is possible to allocate a small bit field to other instructions and improve code efficiency to be extremely high.

A diagram for explaining an example of an instruction set of the CPU 100 according to the first embodiment is shown in FIG. 10. In FIG. 10, explanation of a 16-bit operation code and processing content is shown for each of mnemonics.

The instruction set of the CPU 100 is shown in FIG. 10. All instructions executable by the CPU 100 are listed in FIG. 10. Specifically, the instruction set of the CPU 100 includes a data transfer instruction group 150 and conditional branch instruction groups (more specifically, an unconditional branch instruction group 160 and a conditional branch instruction group 170). The arithmetic operation instruction, the logical operation instruction, and the shift operation instruction performed by the arithmetic processor 40 are omitted.

The data transfer instruction group 150 includes an inter-register transfer instruction and an inter-register-memory transfer instruction.

The inter-register transfer instruction includes an LDR instruction. The LDR instruction is an instruction for instructing transfer from a transfer source register designated as a transfer source by an operation code section to a transfer destination register designated as a transfer destination by the operation code section. The inter-register-memory transfer instruction includes an LDI instruction, an LDM instruction, an STM instruction, an LDU instruction, and an STU instruction. The LDI instruction is an instruction for instructing transfer of an immediate value designated by an operation code section to a transfer destination register designated by the operation code section. The LDM instruction is an instruction for instructing transfer of data stored in an address on a memory at a transfer source designated by an operation code section to a transfer destination register designated by the operation code section. The STM instruction is an instruction for instructing transfer of data set in a transfer source register designated by an operation code section to an address on a memory at a transfer destination designated by the operation code section. The LDU instruction is an instruction for instructing readout of a value as an address of a transfer source register designated by an operation code section and transfer of the value to a transfer destination register designated by the operation code section. The STU instruction is an instruction for instructing transfer of data set in a transfer source register designated by an operation code section to a storage area of a memory having a value of a transfer destination register as an address.

The unconditional branch instruction group 160 includes a JP instruction, a JS instruction, a JPO instruction, a JSO instruction, a JPR instruction, a JSR instruction, an RTS instruction, and an NOP instruction. The JP instruction is an instruction for instructing branching to a branch destination absolute address designated by an operation code section. The JS instruction is a subroutine branch instruction and is an instruction for subroutine branch to a subroutine branch destination absolute address designated by an operation code section. The JPO instruction is an instruction for instructing branching to a branch destination address advanced by a relative jump destination address designated by an operation code section or a branch destination address returned by the relative jump destination address with reference to, for example, a present execution address. The JPR instruction is an instruction for instructing branching with a value stored in a register designated by an operation code section set as a branch destination address. The JSR instruction is an instruction for instructing, with a value stored in a register designated by an operation code section set as a relative value, branching to a branch destination address advanced by the relative value or a branch destination address returned by the relative value with reference to, for example, a present execution address. The RTS instruction is a subroutine return instruction. The NOP instruction is an instruction for instructing execution of no instruction.

The conditional branch instruction group 170 includes an EQR instruction, an EQI instruction, an NER instruction, an NEI instruction, a GTR instruction, a GTI instruction, an LTR instruction, and an LTI instruction.

The EQR instruction is an instruction for instructing branching to, for example, a branch destination address designated by an operand section when a value stored in a reference register designated by an operation code section and a value stored in a comparative register designated by the operation code section coincide with each other. The EQI instruction is an instruction for instructing branching to, for example, a branch destination address designated by an operand section when a value stored in a reference register designated by an operation code section and an immediate value designated by the operation code section coincide with each other.

The NER instruction is an instruction for instructing branching to, for example, a branch destination address designated by an operand section when a value stored in a reference register designated by an operation code section and a value stored in a comparative register designated by the operation code section coincide with each other. The NEI instruction is an instruction for instructing branching to, for example, a branch destination address designated by an operand section when a value stored in a reference register designated by an operation code section and an immediate value designated by the operation code section do not coincide with each other.

The GTR instruction is an instruction for instructing branching to, for example, a branch destination address designated by an operand section when a value stored in a reference register designated by an operation code section is larger than a value stored in a comparative register designated by the operation code section. The GTI instruction is an instruction for instructing branching to, for example, a branch destination address designated by an operand section when a value stored in a reference register designated by an operation code section is larger than an immediate value designated by the operation code section.

The LTR instruction is an instruction for instructing branching to, for example, a branch destination address designated by an operand section when a value stored in a reference register designated by an operation code section is smaller than a value stored in a comparative register designated by the operation code section. The LTI instruction is an instruction for designating branching to, for example, a branch destination address designated by an operand section when a value stored in a reference register designated by an operation code section is smaller than an immediate value designated by the operation code section.

In this way, in the first embodiment, only the data transfer instruction group 150, the unconditional branch instruction group 160, and the conditional branch instruction group 170 are specified in the instruction set of the CPU 100. However, since the arithmetic processor 40 is provided, it is possible to obtain an arithmetic operation result, a logical operation result, and a shift operation result in each of the give execution cycles. Specifically, the instruction decoding unit 60 of the CPU 100 decodes a data transfer instruction and branch instructions (an unconditional branch instruction and a conditional branch instruction) excluding an arithmetic operation instruction, a logical operation instruction, and a shift operation instruction. Moreover, irrespectively of a decoding result of the instruction decoding unit 60, the plural arithmetic processing units of the arithmetic processor 40 store, in each of the execution cycles, processing results of the arithmetic processing units in the accumulators corresponding thereto. Consequently, the instruction decoding unit 60 is simplified and does not need to have an arithmetic operation instruction, a logical operation instruction, and a shift operation instruction in an operation code. Therefore, it is possible to allocate a small bit field to other instructions and improve code efficiency to be extremely high.

Further, since it is unnecessary to have the arithmetic operation instruction, the logical operation instruction, and the shift operation instruction in the operation code, as a code of a computer program executed by the CPU 100, compared with codes in the past, a code with high security can be generated by increasing difficulty in reading the code and making disassemble difficult. As a result, it is possible to contribute to reverse engineering prevention and improvement of security.

Second Embodiment

The CPU according to the invention is not limited to the configuration shown in FIG. 7. It is possible to obtain various arithmetic processing results while improving code efficiency by varying general-purpose registers allocated to arithmetic processing units.

Figure 11:
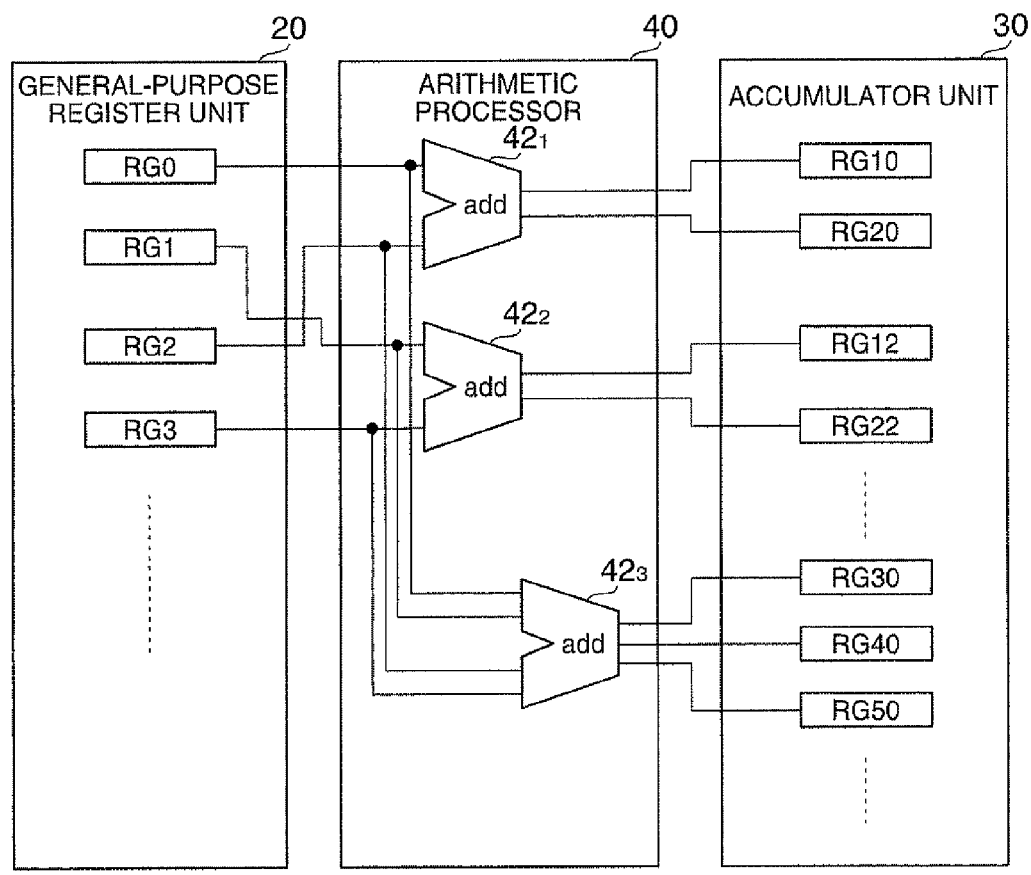
FIG. 11 is a block diagram of a configuration example of a general-purpose register unit, an arithmetic processor, and an accumulator unit according to a second embodiment of the invention.

A block diagram of a configuration example of the general-purpose register unit 20, the arithmetic processor 40, and the accumulator unit 30 according to a second embodiment of the invention is shown in FIG. 11. In FIG. 11, components same as those shown in FIG. 7 are denoted by the same reference numerals and signs and explanation of the components is omitted as appropriate.

The configuration shown in FIG. 11 is different from the configuration shown in FIG. 7 in that, when 32-bit stored data is set in the general-purpose registers RG0 and RG1 and 32-bit stored data is set in the general-purpose registers RG2 and RG3, the arithmetic processing unit $42_1$ performs addition processing for lower-order 16 bits of the former 32-bit stored data and lower-order 16 bits of the latter 32-bit stored data and the arithmetic processing unit $42_2$ performs addition processing for higher-order 16 bits of the former 32-bit stored data and higher-order 16 bits of the latter 32-bit stored data.

Specifically, the arithmetic processing unit $42_1$ (a first adding unit) performs addition processing for stored data of the general-purpose register RG0 (a first input register) and stored data of the general-purpose register RG2 (a third input register). The arithmetic processing unit $42_2$ (a third adding unit) performs addition processing for stored data of the general-purpose register RG1 (a second input register) and stored data of the general-purpose register RG3 (a fourth input register). The arithmetic processing unit $42_3$ (a second adding unit) performs addition processing for first connected data, which is obtained by connecting the stored data of the general-purpose register RG0 as lower-order data and the stored data of the general-purpose register RG1 as higher-order data, and second connected data, which is obtained by connecting the stored data of the general-purpose register RG2 as lower-order data and the stored data of the general-purpose register RG3 as higher-order data. In each of execution cycles, the arithmetic processing unit $42_1$ stores a processing result in the accumulators RG10 and RG20, the arithmetic processing unit $42_2$ stores a processing result in the accumulators RG12 and RG22, and the arithmetic processing unit $42_3$ stores a processing result in the accumulators RG30, RG40, and RG50. More specifically, the general-purpose registers RG0 and RG2 are allocated to the arithmetic processing unit $42_1$ and the general-purpose registers RG1 and RG3 are allocated to the arithmetic processing unit $42_2$ out of the plural general-purpose registers. The arithmetic processing unit $42_3$ is caused to perform addition processing for data connected by the general-purpose registers RG0 and RG1 and data connected by the general-purpose registers RG2 and RG3.

By changing the general-purpose registers respectively allocated to the arithmetic processing units $42_1$ to $42_3$, which are operable in parallel to one another, in this way, it is possible to provide, for example, in processing explained below, a CPU suitable in terms of efficiency of a code, reverse engineering prevention, and the like.

Figure 12:
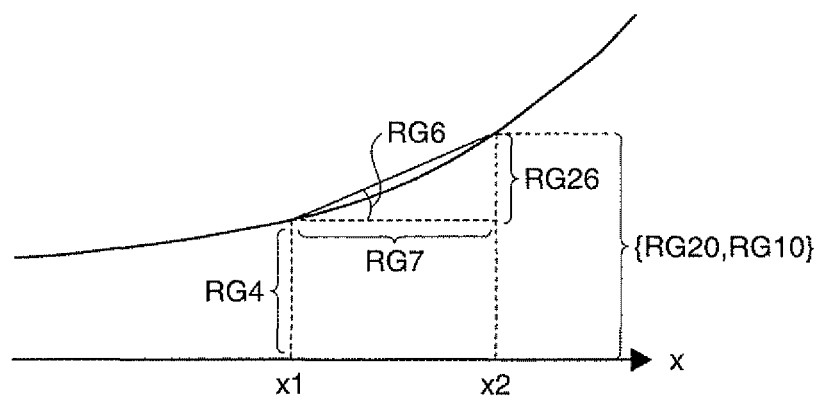
FIG. 12 is a diagram for explaining an effect by the configuration of a CPU according to the second embodiment.

A diagram for explaining an effect by the configuration of the CPU according to the second embodiment is shown in FIG. 12. FIG. 12 is a diagram for explaining linear interpolation processing performed with reference to tables suitable for the CPU according to the second embodiment.

Figure 13:
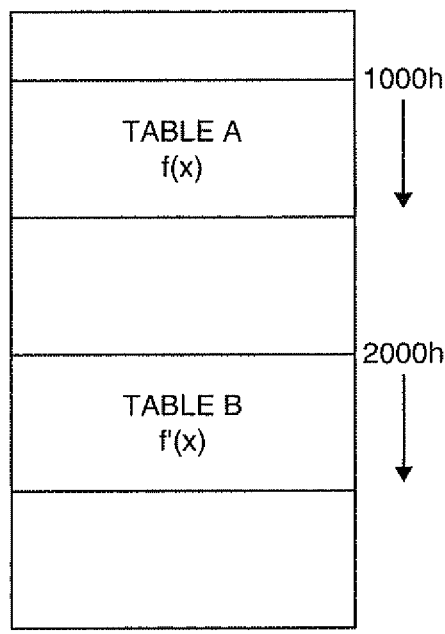
FIG. 13 is a diagram for explaining tables referred to in linear interpolation processing shown in FIG. 12.

A diagram for explaining the tables referred to in the linear interpolation processing shown in FIG. 12 is shown in FIG. 13. An example of a computer program of the CPU according to the second embodiment for realizing processing shown in FIG. 12 is shown in FIG. 14. In FIG. 14, it is assumed that the CPU according to the second embodiment includes, as shown in FIGS. 6 and 7, the arithmetic processing unit $40_4$ that is operable in parallel to the arithmetic processing units $42_1$ to $42_3$. An example of a general computer program of the CPU for realizing the processing shown in FIG. 12 is shown in FIG. 15.

A state of linear interpolation processing of a given function f(x) performed with reference to the tables shown in FIG. 13 is shown in FIG. 12. A discrete value of f(x) from a base address "1000h" is stored in a table A shown in FIG. 13. A value of f'(x) (a tilt in x) from a base address "2000h" is stored in a table B shown in FIG. 13. Therefore, in the table A, a value of f(x₀) is stored in a storage area advanced by given offset with the base address set as a reference. In the table B, a value of f'(x₀) is stored in a storage area advanced by given offset with the base address set as a reference.

When f(x2) is calculated by the linear interpolation processing with reference to f(x1) stored in the table A, in the computer program shown in FIG. 14, f(x1) is substituted in the general-purpose register RG4 from the table A, f'(x1) is substituted in the general-purpose register RG6 from the table B, a value corresponding to (x2−x1) is substituted in the general-purpose register RG7, and a value corresponding to (f(x2)−f(x1)) is substituted in the accumulator RG26. f(x2) is substituted in the general-purpose registers RG10 and RG20.

On the other hand, in the general computer program, as shown in FIG. 15, f(x2) is calculated by using an ADD instruction and a MUL instruction. Therefore, when coding is performed by the general computer program, an instruction set is complicated and efficiency of a code cannot be realized.

As explained above, according to the second embodiment, it is possible to perform addition processing and the like for different bit lengths while referring to the tables in the linear interpolation processing. Therefore, it is unnecessary to explicitly designate arithmetic processing and contribute to efficiency of a code, reverse engineering prevention, and improvement of security.

Third Embodiment

In the first embodiment or the second embodiment, the arithmetic processing unit $42_3$ is configured to be operable in parallel to the arithmetic processing units $42_1$ and $42_2$ irrespectively of processing results of the arithmetic processing units $42_1$ and $42_2$. However, the invention is not limited to this.

Figure 16:
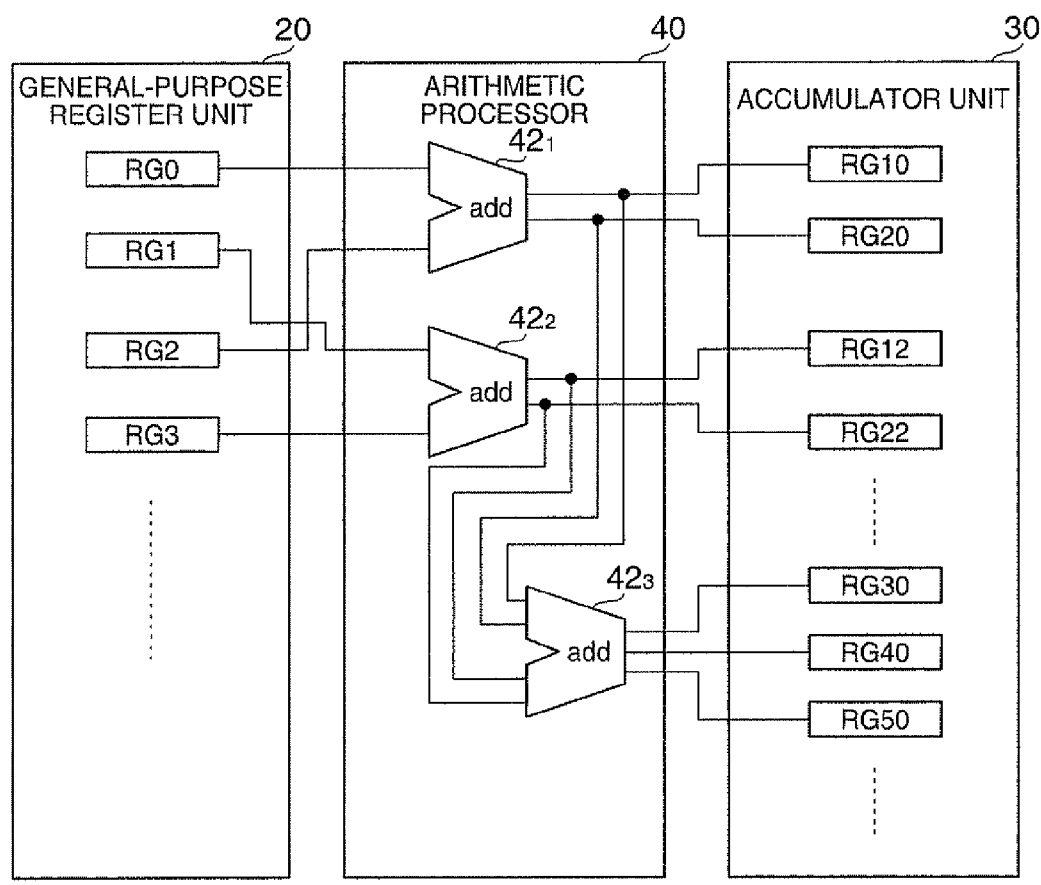
FIG. 16 is a block diagram of a configuration example of a general-purpose register unit, an arithmetic processor, and an accumulator unit according to a third embodiment of the invention.

A block diagram of a configuration example of the general-purpose register unit 20, the arithmetic processor 40, and the accumulator unit 30 according to a third embodiment of the invention is shown in FIG. 16. In FIG. 16, components same as those shown in FIG. 11 are denoted by the same reference numerals and signs and explanation of the components is omitted as appropriate.

The configuration shown in FIG. 16 is different from the configuration shown in FIG. 11 in that the arithmetic processing unit $42_3$ performs addition processing for processing results of the arithmetic processing units $42_1$ and $42_2$.

Specifically, the arithmetic processing unit $42_1$ (a first adding unit) performs addition processing for stored data of the general-purpose register RG0 (a first input register) and stored data of the general-purpose register RG2 (a third input register). The arithmetic processing unit $42_2$ (a third adding unit) performs addition processing for stored data of the general-purpose register RG1 (a second input register) and stored data of the general-purpose register RG3 (a fourth input register). The arithmetic processing unit $42_3$ (a second adding unit) performs addition processing for a processing result of the arithmetic processing unit $42_1$ and a processing result of the arithmetic processing unit $42_2$. In each of execution cycles, the arithmetic processing unit $42_1$ stores a processing result in the accumulators RG10 and RG20, the arithmetic processing unit $42_2$ stores a processing result in the accumulators RG12 and RG22, and the arithmetic processing unit $42_3$ stores a processing result in the accumulators RG30, RG40, and RG50. More specifically, the general-purpose registers RG0 and RG2 are allocated to the arithmetic processing unit $42_1$ and the general-purpose registers RG1 and RG3 are allocated to the arithmetic processing unit $42_2$ out of the plural general-purpose registers. The arithmetic processing unit $42_3$ is caused to perform addition processing for the processing result of the arithmetic processing unit $42_1$ and the processing result of the arithmetic processing unit $42_2$.

By changing the general-purpose registers respectively allocated to the arithmetic processing units $42_1$ to $42_3$, which are operable in parallel to one another, in this way, as in the first embodiment or the second embodiment, it is possible to provide a CPU suitable in terms of efficiency of a code, reverse engineering prevention, and the like. In any of the embodiments, it is possible to provide a CPU that can simultaneously perform a large number of kinds of arithmetic processing different from one another.

2. Electronic Apparatus

The CPU according to any one of the embodiments can be mounted on an electronic apparatus such as a projector. An example in which the electronic apparatus according to any one of the embodiments is a projector is explained below. However, the electronic apparatus to which the CPU according to any one of the embodiments is applied is not limited to the projector. It goes without saying that the CPU can be applied to various electronic apparatuses.

Figure 17:
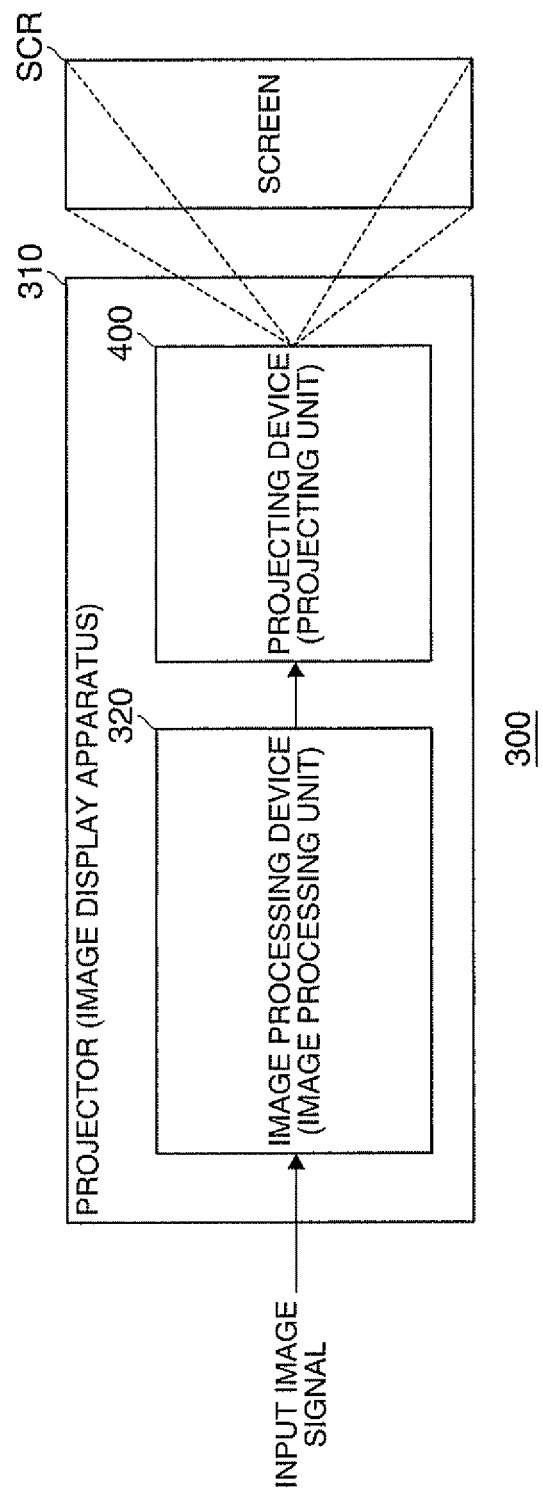
FIG. 17 is a block diagram of a configuration example of an image display system including a projector as an electronic apparatus according to the invention.

A block diagram of a configuration example of an image display system including the projector as the electronic apparatus according to the invention is shown in FIG. 17.

An image display system 300 includes a projector (in a broad sense, an image display apparatus) 310 and a screen SCR. The projector 310 modulates light from a not-shown light source on the basis of an input image signal and projects the light after the modulation on the screen SCR to display an image.

The projector 310 includes an image processing device 320 (in a broad sense, an image processing unit) and a projecting device 400 (in a broad sense, a projecting unit and an image display unit). The image processing device 320 corrects the input image signal and outputs the image signal after the correction to the projecting device 400. Examples of correction processing performed by such an image processing device 320 include edge enhancement processing, detail enhancement processing, and gradation correction processing. The projecting device 400 projects light modulated on the basis of the image signal from the image processing device 320 on the screen SCR.

Figure 18:
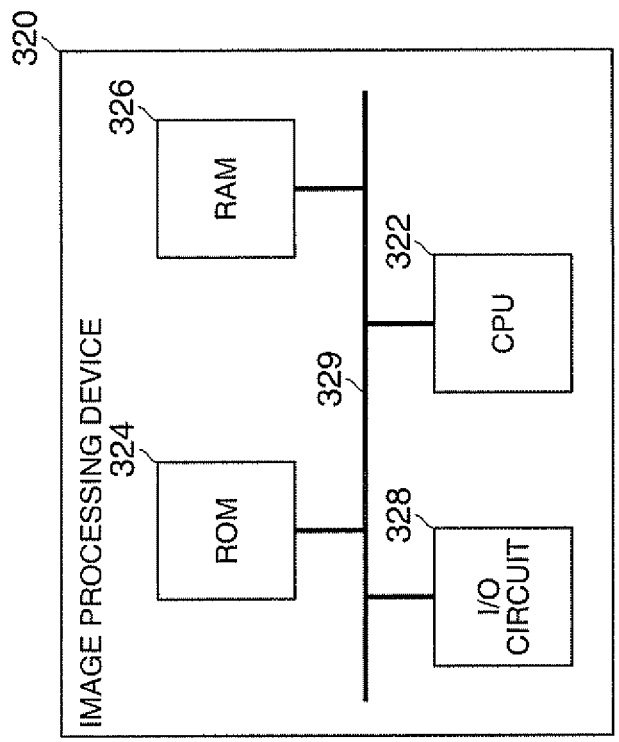
FIG. 18 is a block diagram of the hardware configuration example of an image processing device shown in FIG. 17.

A block diagram of a hardware configuration example of the image processing device 320 shown in FIG. 17 is shown in FIG. 18.

The image processing device 320 includes a CPU 322, a read only memory (ROM) 324, a random access memory (RAM) 326, an I/O (Input/Output) circuit 328, and a bus 329. The CPU 322, the ROM 324, the RAM 326, and the I/O circuit 328 are electrically connected to one another via the bus 329.

For example, a computer program and data for realizing functions of the image processing device 320 are stored in the ROM 324 or the RAM 326. The computer program is an instruction data sequence including an operation code section and an operand section corresponding to the operation code specified by the instruction set shown in FIG. 10. The data stored in the ROM 324 or the RAM 326 is referred to by instruction data forming the instruction data sequence.

The CPU 322 has the configuration and the functions of the CPU 100 shown in FIG. 2 as the information processing device 10 according to any one of the embodiments. The CPU 322 can realize the functions of the image processing device 320 in software processing by reading out the computer program stored in the ROM 324 or the RAM 326 and executing processing corresponding to the computer program. The RAM 326 is used as a work area for processing by the CPU 322 and used as a buffer area for the I/O circuit 328 and the ROM 324.

The I/O circuit 328 performs input interface processing for an image signal from a not-shown image signal generating device, output interface processing for an image signal from the image processing device 320 to the projecting device 400, and the like.

With the configuration shown in FIG. 18, the image processing device 320 reads out the computer program stored in the ROM 324 or the RAM 326 and executes processing corresponding to the computer program to generate, in software processing, an image signal obtained by applying, for example, edge enhancement processing, detail enhancement processing, or gradation correction processing to an input image signal. The arithmetic operation processing and the like can be realized by the instruction data sequence not including an arithmetic operation instruction, a logical operation instruction, and a shift operation instruction. Therefore, it is possible to perform image processing such as the edge enhancement processing, the detail enhancement processing, and the gradation correction processing at extremely high code efficiency, with increased difficulty in reading a code, and with a code with high security. The image signal processed by such an image processing device 320 is sent to the projecting device 400.

Figure 19:
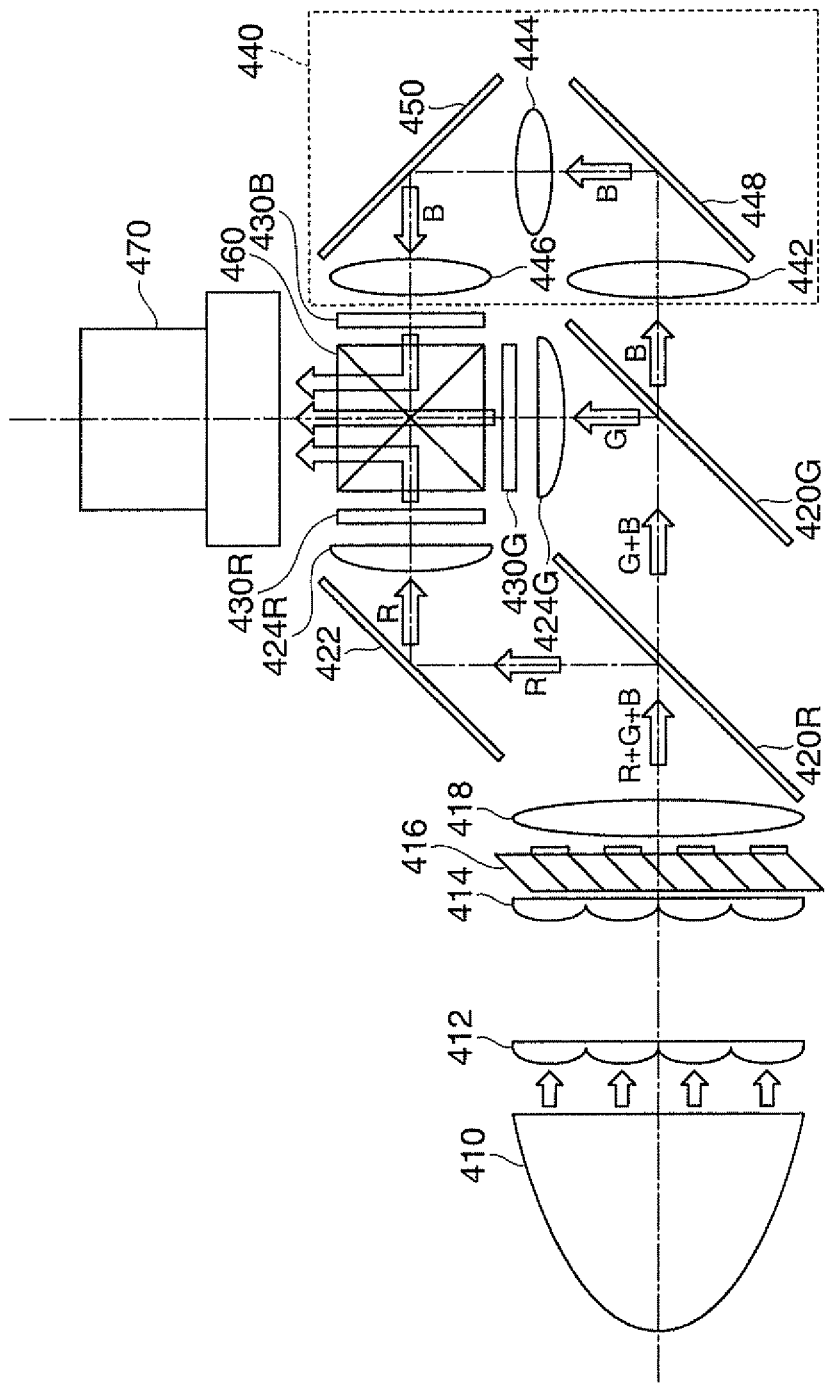
FIG. 19 is a diagram of a configuration example of a projecting device shown in FIG. 17.

A diagram of a configuration example of the projecting device 400 shown in FIG. 17 is shown in FIG. 19. In FIG. 19, the projecting device 400 is explained as including a so-called 3LCD liquid crystal projector. However, the projecting device according to the invention is not limited to the projecting device including the 3LCD liquid crystal projector. In the following explanation, one pixel is explained as including a sub-pixel for an R component, a sub-pixel for a G component, and a sub-pixel for a B component. However, the invention is not limited by the number of sub-pixels (the number of color components) included in one pixel.

In FIG. 19, it is assumed that, after a luminance signal Y and color difference signals U and V input from the image processing device 320 are converted into image signals of respective color components R, G, and B, light from a light source is modulated for each of the color components. In this case, a converting circuit for conversion into the R, G, and B signals may be included in the image processing device 320 or may be included in the projecting device 400.

The projecting device 400 includes a light source 410, integrator lenses 412 and 414, a deflection converting element 416, a superimposing lens 418, a dichroic mirror for R 420R, a dichroic mirror for G 420G, a reflection mirror 422, a field lens for R 424R, a field lens for G 424G, a liquid crystal panel for R 430R (a first light modulating element), a liquid crystal panel for G 430G (a second light modulating element), a liquid crystal panel for B 430B (a third light modulating element), a relay optical system 440, a cross dichroic prism 460, and a projection lens 470. Liquid crystal panels used as the liquid crystal panel for R 430R, the liquid crystal panel for G 430G, and the liquid crystal panel for B 430B are transmissive liquid crystal display devices. The relay optical system 440 includes relay lenses 442, 444, and 446 and reflection mirrors 448 and 450.

The light source 410 includes, for example, an ultrahigh pressure mercury lamp and emits light including at least light of an R component, light of a G component, and light of a B component. The integrator lens 412 includes plural small lenses for dividing light from the light source device 410 into plural partial lights. The integrator lens 414 has plural small lenses corresponding to the plural small lenses of the integrator lens 412. The superimposing lens 418 superimposes, on a liquid crystal panel, the partial lights emitted from the plural small lenses of the integrator lens 412.

The polarization converting element 416 includes a polarization beam splitter array and a λ/2 plate and converts light from the light source 410 into a generally one kind of polarized light. The polarization beam splitter array has structure in which a polarization separating film that separates the partial lights, which are divided by the integrator lens 412, into p-polarized light and s-polarized light and a reflection film that changes a direction of light from the polarization separating film are alternately arrayed. Two kinds of polarized light separated by the polarization separating film are aligned in a polarization direction by the λ/2 plate. The light converted into the generally one kind of polarized light by the polarization converting element 416 is irradiated on the superimposing lens 418.

The light from the superimposing lens 418 is made incident on the dichroic mirror for R 420R. The dichroic mirror for R 420R has a function of reflecting the light of the R component and transmitting the lights of the G component and the B component. The light transmitted through the dichroic mirror for R 420R is irradiated on the dichroic mirror for G 420G. The light reflected by the dichroic mirror for R 420R is reflected by the reflection mirror 422 and guided to the field lens for R 424R.

The dichroic mirror for G 420G has a function of reflecting the light of the G component and transmitting the light of the B component. The light transmitted through the dichroic mirror for G 420G is made incident on the relay optical system 440. The light reflected by the dichroic mirror for G 420G is guided to the field lens for G 424G.

In order to reduce a difference between optical path length of the light of the B component transmitted through the dichroic mirror for G 420G and optical path length of the other lights of the R component and the G component as much as possible, the relay optical system 440 corrects the difference between the optical path lengths using the relay lenses 442, 444, and 446. The light transmitted through the relay lens 442 is guided to the relay lens 444 by the reflection mirror 448. The light transmitted through the relay lens 444 is guided to the relay lens 446 by the reflection mirror 450. The light transmitted through the relay lens 446 is irradiated on the liquid crystal panel for B 430B.

The light irradiated on the field lens for R 424R is converted into parallel rays and made incident on the liquid crystal panel for R 430R. The liquid crystal panel for R 430R functions as a light modulating element (a light modulating unit). The transmittance (passing rate or modulation rate) thereof changes on the basis of an image signal for R. Therefore, the light (light of a first color component) made incident on the liquid crystal panel for R 430R is modulated on the basis of the image signal for R. The light after the modulation is made incident on the cross dichroic prism 460.

The light irradiated on the field lens for G 424G is converted into parallel rays and made incident on the liquid crystal panel for G 430G. The liquid crystal panel for G 430G functions as a light modulating element (a light modulating unit). The transmittance (passing rate or modulation rate) thereof changes on the basis of an image signal for G. Therefore, the light (light of a second color component) made incident on the liquid crystal panel for G 430G is modulated on the basis of the image signal for G. The light after the modulation is made incident on the cross dichroic prism 460.

The liquid crystal panel for B 430B on which the lights converted into parallel rays by the relay lenses 442, 444, and 446 are irradiated functions as a light modulating element (a light modulating unit). The transmittance (passing rate or modulation rate) thereof changes on the basis of an image signal for B. Therefore, the light (light of a third color component) made incident on the liquid crystal panel for B 430B is modulated on the basis of the image signal for B. The light after the modulation is made incident on the cross dichroic prism 460.

The liquid crystal panel for R 430R, the liquid crystal panel for G 430G, and the liquid crystal panel for B 430B have the same configuration as one another. The liquid crystal panels are formed by filling and enclosing liquid crystal as an electro-optic substance in a pair of transparent glass substrates. The liquid crystal panels modulate passing rates of the color lights according to image signals of the sub-pixels using, for example, a polysilicon thin-film transistor as a switching element.

The image processing device 320 generates, for each of the color components forming one pixel, an image signal obtained by applying, for example, the edge enhancement processing, the detail enhancement processing, and the gradation correction processing to an input image signal. In the projecting device 400, liquid crystal panels as light modulating elements are provided for the respective color components forming one pixel. The transmittances of the liquid crystal panels are controlled by the image signals corresponding to the sub-pixels. Specifically, the image signal for the sub-pixel for the R component is used for controlling the transmittance (passing rate or modulation rate) of the liquid crystal panel for R 430R. The image signal for the sub-pixel for the G component is used for controlling the transmittance of the liquid crystal panel for G 430G. The image signal for the sub-pixel for the B component is used for controlling the transmittance of the liquid crystal panel for B 430B.

The cross dichroic prism 460 has a function of outputting, as emission light, combined light obtained by combining the incident lights from the liquid crystal panel for R 430R, the liquid crystal panel for G 430G, and the liquid crystal panel for B 430B. The projection lens 470 is a lens that focuses an output image on the screen SCR in enlargement.

The image display system 300 can control the projecting device 400 having such a configuration and display an image on the screen SCR on the basis of the image signal corrected in the gradation correction processing or the like.

As explained above, the projector 310 includes the memory that stores a computer program and data and the CPU 322 (or the image processing device 320 including the CPU 322) that performs arithmetic processing corresponding to the computer program and the data. Consequently, it is possible to provide the projector 310 or the image display system 300 including the projector 310 that can realize complicated arithmetic processing at extremely high code efficiency and, on the other hand, can perform reverse engineering prevention and improvement of security.

The information processing device, the arithmetic processing method, the electronic apparatus, and the like have been explained on the basis of the embodiments. However, the invention is not limited to the embodiments. The invention can be carried out in various forms without departing from the spirit of the invention. For example, modifications explained below are also possible.

(1) In the embodiments, the general-purpose register is allocated in advance to any one of the arithmetic processing units included in the arithmetic processor. However, the general-purpose registers may be dynamically allocated to any one of the plural arithmetic processing units included in the arithmetic processor.

(2) In the embodiments, the accumulator is allocated in advance to any one of the arithmetic processing units included in the arithmetic processor. However, the accumulators may be dynamically allocated to any one of the plural arithmetic processing units included in the arithmetic processor.

(3) The invention is not limited by the number of general-purpose registers and the number of accumulators explained in the embodiments.

(4) In the embodiments, the arithmetic operation, the logical operation, and the shift operation shown in FIG. 8 are explained as examples of the arithmetic operation performed by the arithmetic processing units. However, the invention is not limited to the arithmetic operation, the logical operation, and the shift operation shown in FIG. 8. For example, the arithmetic processing units may perform division.

(5) In the embodiments, the instruction set shown in FIG. 10 is explained as an example. However, the invention is not limited to the instruction set shown in FIG. 10.

(6) In the embodiments, the projector is explained as an example of the electronic apparatus to which the information processing device according to the invention is applied. However, the invention is not limited to this. In the projector, one pixel is explained as including the sub-pixels for the three color components. However, the invention is not limited to this. The number of color components included in one pixel may be two or four or more. The transmissive liquid crystal panel is explained as being used as the light modulation element of the projector. However, the invention is not limited to this. For example, DLP (Digital Light Processing) (registered trademark) or LCOS (Liquid Crystal On Silicon) may be adopted as the light modulating unit. Further, the light valve employing a so-called 3LCD transmissive liquid crystal panel is explained as an example of the light modulation element of the projector. However, a light valve employing, for example, a 1LCD liquid crystal panel or a 4LCD or higher transmissive liquid crystal panel may be adopted.

(7) In the embodiments, the invention is explained as the information processing device, the arithmetic processing method, and the electronic apparatus. However, the invention is not limited to this.

What is claimed is:

1. An information processing device comprising:
    plural input registers including a first input register, a second input register, a third input register, and a fourth input register;
    a first adding unit that performs addition processing for stored data of the first input register and stored data of the third input register;
    a second adding unit that performs addition processing for first connected data, which is obtained by connecting the stored data of the first input register as lower-order data and stored data of the second input register as higher-order data, and second connected data, which is obtained by connecting the stored data of the third input register as lower-order data and stored data of the fourth input register as higher-order data;
    a third adding unit that performs addition processing for the stored data of the second input register and the stored data of the fourth input register; and
    plural output registers in which a processing result of the first adding unit or the second adding unit is stored, wherein
    in each of given execution cycles, the first adding unit stores a processing result of the first adding unit in any one of the plural output registers and the second adding unit stores a processing result of the second adding unit in any one of the plural output registers,
    the plural output registers include a register in which a processing result of the third adding unit is stored, and
    in each of the execution cycles, the first adding unit stores the processing result of the first adding unit in any one of the plural output registers, the second adding unit stores the processing result of the second adding unit in any one of the plural output registers, and the third adding unit stores the processing result of the third adding unit in any one of the plural output registers.

2. The information processing device according to claim 1, wherein the first adding unit and the second adding unit are configured to be operable in parallel to each other.

3. The information processing device according to claim 1, wherein the first to third adding units are configured to be operable in parallel to one another.

4. The information processing device according to claim 1, further comprising an instruction decoding unit that decodes fetched instruction data, wherein the processing results of the adding units are stored in any one of the plural output registers irrespectively of a decoding result of the instruction decoding unit.

5. The information processing device according to claim 4, wherein the instruction decoding unit decodes a data transfer instruction and a branch instruction excluding an arithmetic operation instruction, a logical operation instruction, and a shift operation instruction.

6. The information processing device according to claim 1, wherein the processing results of the adding units stored in the plural output registers are formed to be transferable to any one of the plural input registers.

7. An electronic apparatus comprising:
    a memory that stores a computer program and data; and
    the information processing device according to claim 1 that performs arithmetic processing corresponding to the computer program and the data.

8. A method of processing information with an information processing device, the information processing device including plural input registers including a first input register, a second input register, a third input register, and a fourth input register, a first adding unit, a second adding unit, a third adding unit, and plural output registers, the method comprising:
    performing addition processing for stored data of the first input register and stored data of the third input register, utilizing the first adding unit;
    performing addition processing for first connected data, which is obtained by connecting the stored data of the first input register as lower-order data and stored data of the second input register as higher-order data, and second connected data, which is obtained by connecting the stored data of the third input register as lower-order data and stored data of the fourth input register as higher-order data, utilizing the second adding unit;
    performing addition processing for the stored data of the second input register and the stored data of the fourth input register, utilizing the third adding unit;
    storing a processing result of the first adding unit or the second adding unit in the plural output registers; and
    in each of given execution cycles, storing a processing result of the first adding unit in any one of the plural output registers and storing a processing result of the second adding unit in any one of the plural output registers,
    the plural output registers include a register storing a processing result of the third adding unit, and
    in each of the execution cycles, the first adding unit storing the processing result of the first adding unit in any one of the plural output registers, the second adding unit storing the processing result of the second adding unit in any one of the plural output registers, and the third adding unit storing the processing result of the third adding unit in any one of the plural output registers.

* * * * *